(12) United States Patent
Han et al.

(10) Patent No.: US 10,257,076 B2
(45) Date of Patent: Apr. 9, 2019

(54) APPARATUS AND METHOD TRANSMITTING PACKETS

(71) Applicants: Samsung Electronics Co., Ltd., Suwon-si (KR); Seoul National University R&DB Foundation, Seoul (KR)

(72) Inventors: Sungju Han, Seoul (KR); Jinho Lee, Seoul (KR); Kiyoung Choi, Seoul (KR); Woong Seo, Hwaseong-si (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 223 days.

(21) Appl. No.: 15/132,663

(22) Filed: Apr. 19, 2016

(65) Prior Publication Data
US 2017/0078189 A1    Mar. 16, 2017

(30) Foreign Application Priority Data
Sep. 10, 2015    (KR) .................. 10-2015-0128568

(51) Int. Cl.
*H04L 12/44* (2006.01)
*H04L 12/733* (2013.01)
(Continued)

(52) U.S. Cl.
CPC .............. *H04L 45/20* (2013.01); *H04L 12/44* (2013.01); *H04L 12/5692* (2013.01);
(Continued)

(58) Field of Classification Search
CPC ....... H04L 12/44; H04L 12/46; H04L 12/462; H04L 12/4625; H04L 12/5692;
(Continued)

(56) References Cited

U.S. PATENT DOCUMENTS 6,498,795 B1 * 12/2002 Zhang ............... G06F 17/30864
370/400
6,631,128 B1 * 10/2003 Lemieux ............. H04L 12/5601
370/230

(Continued)

FOREIGN PATENT DOCUMENTS

| JP | 2015-50594 A | 3/2015 |
| KR | 10-2011-0018558 A | 2/2011 |
| KR | 10-2013-0033898 A | 4/2013 |

OTHER PUBLICATIONS

Woo, Steven Cameron, et al. "The SPLASH-2 Programs: Characterization and Methodological Considerations." *ACM SIGARCH Computer Architecture News*. vol. 23. No. 2. ACM, 1995.

(Continued)

*Primary Examiner* — Alpus Hsu

(74) *Attorney, Agent, or Firm* — F. Chau & Associates, LLC

(57) ABSTRACT

Provided is a multi network and method to transmit packets. The multi network includes a mesh network, a tree network, and a network interface connected to the mesh network and the tree network and configured to transmit, through the mesh network and the tree network, a packet generated by a processing unit, of a processing system having plural processing units, at a starting point to a destination point for another processing unit of the processing system and configured to selectively inject the packet into one of the mesh network and the tree network to transmit the packet to the other processing unit.

15 Claims, 18 Drawing Sheets

(51) Int. Cl.
*H04L 12/741* (2013.01)
*H04L 12/727* (2013.01)
*H04L 12/947* (2013.01)
*H04L 12/54* (2013.01)
*H04L 12/933* (2013.01)

(52) U.S. Cl.
CPC .......... *H04L 45/121* (2013.01); *H04L 45/122* (2013.01); *H04L 45/74* (2013.01); *H04L 49/25* (2013.01); *H04L 49/109* (2013.01)

(58) Field of Classification Search
CPC ....... H04L 2012/644; H04L 2012/6443; H04L 45/121; H04L 45/122; H04L 45/20; H04L 45/74; H04L 49/109; H04L 49/25
See application file for complete search history.

(56) References Cited

U.S. PATENT DOCUMENTS

| | | | | |
|---|---|---|---|---|
| 6,751,219 | B1* | 6/2004 | Lipp | H04L 49/201 370/390 |
| 7,349,414 | B2* | 3/2008 | Sandstrom | H04J 3/1682 370/252 |
| 7,496,078 | B2* | 2/2009 | Rahman | H04L 45/22 370/338 |
| 7,606,178 | B2* | 10/2009 | Rahman | H04L 45/02 370/256 |
| 7,623,533 | B2* | 11/2009 | Wakumoto | H04L 45/48 370/256 |
| 7,653,011 | B2* | 1/2010 | Rahman | H04L 45/02 370/256 |
| 7,657,648 | B2* | 2/2010 | Xiong | H04L 12/185 709/230 |
| 7,774,448 | B2* | 8/2010 | Shah-Heydari | H04L 45/48 709/220 |
| 7,787,361 | B2* | 8/2010 | Rahman | H04W 40/26 370/217 |
| 7,995,501 | B2* | 8/2011 | Jetcheva | H04L 45/122 370/229 |
| 8,036,144 | B2* | 10/2011 | Kim | H04L 45/18 370/254 |
| 8,045,488 | B2* | 10/2011 | Swan | H04L 41/12 370/256 |
| 8,064,360 | B2* | 11/2011 | Chiang | H04L 12/2834 370/252 |
| 8,125,928 | B2* | 2/2012 | Mehta | H04L 12/4625 370/254 |
| 8,230,108 | B2* | 7/2012 | Pratt, Jr. | H04L 12/66 709/238 |
| 8,270,302 | B2* | 9/2012 | Chu | H04L 12/66 370/238 |
| 8,504,734 | B2* | 8/2013 | Xiong | H04L 12/185 709/206 |
| 8,601,423 | B1 | 12/2013 | Philip et al. | |
| 8,619,634 | B2* | 12/2013 | Meier | H04W 72/082 370/256 |
| 8,711,704 | B2* | 4/2014 | Werb | H04W 84/18 370/241 |
| 8,717,943 | B2* | 5/2014 | Van Wyk | H04L 45/48 370/254 |
| 8,730,838 | B2* | 5/2014 | Liang | H04W 84/18 370/254 |
| 8,737,226 | B2* | 5/2014 | Liang | H04W 84/18 370/235 |
| 8,892,769 | B2* | 11/2014 | Pratt, Jr. | H04L 12/66 709/238 |
| 9,119,142 | B2* | 8/2015 | Espina Perez | H04L 1/188 |
| 9,148,362 | B2* | 9/2015 | Johri | H04L 12/1854 |
| 9,473,388 | B2* | 10/2016 | Kumar | H04L 45/16 |
| 9,491,074 | B2* | 11/2016 | Li | H04L 12/1863 |
| 9,521,067 | B2* | 12/2016 | Michael | H04L 45/123 |
| 9,537,679 | B2* | 1/2017 | Nowick | H04L 25/03 |
| 9,703,738 | B2* | 7/2017 | Davies | G06F 13/4022 |
| 9,730,078 | B2* | 8/2017 | Nixon | H04L 41/12 |
| 2003/0231624 | A1* | 12/2003 | Alappat | H04L 49/10 370/360 |
| 2007/0230369 | A1* | 10/2007 | McAlpine | H04L 45/00 370/256 |
| 2013/0113519 | A1 | 5/2013 | Nowick et al. | |

OTHER PUBLICATIONS

Dally, William J., and Brian Towles. "Route Packets, Not Wires: On-Chip Interconnection Networks." *Design Automation Conference, 2001. Proceedings.* IEEE, 2001.

Kim, Changkyu, et al. "An Adaptive, Non-Uniform Cache Structure for Wire-Delay Dominated On-Chip Caches." Acm Sigplan Notices. vol. 37. No. 10. ACM, 2002.

Li, Ming, Qing-An Zeng, and Wen-Ben Jone. "DyXY: A Proximity Congestion-Aware Deadlock-Free Dynamic Routing Method for Network on Chip."*Proceedings of the 43rd annual Design Automation Conference*. ACM, 2006.

Kumar, Amit, et al. "Express Virtual Channels: Towards the Ideal Interconnection Fabric." *ACM SIGARCH Computer Architecture News.* vol. 35. No. 2. ACM, 2007.

Kim, John, et al. "Technology-Driven, Highly-Scalable Dragonfly Topology."*ACM SIGARCH Computer Architecture News.* vol. 36. No. 3. IEEE Computer Society, 2008.

Bienia, Christian, et al. "The PARSEC Benchmark Suite: Characterization and Architectural Implications." *Proceedings of the 17th International Conference on Parallel Architectures and Compilation Techniques.* ACM, 2008.

Chang, M. Frank, et al. "CMP Network-On-Chip Overlaid With Multi-Band RF-Interconnect" *High Performance Computer Architecture, 2008. HPCA 2008. IEEE 14th International Symposium on.* Ieee, 2008.

Moscibroda, Thomas, and Onur Mutlu. "A Case for Bufferless Routing in On-Chip Networks." *ACM SIGARCH Computer Architecture News.* vol. 37. No. 3. ACM, 2009.

Matsutani, Hiroki, et al. "Prediction Router: Yet Another Low Latency On-Chip Router Architecture." *High Performance Computer Architecture, 2009. HPCA 2009. IEEE 15th International Symposium on.* IEEE, 2009.

Das, Reetuparna, et al. "Design and Evaluation of a Hierarchical On-Chip Interconnect for Next-Generation CMPs." *High Performance Computer Architecture, 2009. HPCA 2009. IEEE 15th International Symposium on.* IEEE, 2009.

Tilera, "The TILE-GxTM Processor Family" *Mellanox Technologies,* 2009 <http://www.tilera.com/products/processors>.

Pan, Yan, et al. "Firefly: Illuminating Future Network-On-Chip With Nanophotonics." *ACM SIGARCH Computer Architecture News.* vol. 37. No. 3. ACM, 2009.

Flores, Antonio, et al. "Heterogeneous Interconnects for Energy-Efficient Message Management in CMPS."*Computers, IEEE Transactions on* 59.1 (2010): 16-28.

Ahn, Minseon, et al. "Pseudo-Circuit: Accelerating Communication for On-Chip Interconnection Networks." *Proceedings of the 2010 43rd Annual IEEE/ACM International Symposium on Microarchitecture.* IEEE Computer Society, 2010.

Howard, John, et al. "A 48-Core IA-32 Message-Passing Processor with DVFS in 45nm CMOS." *Solid-State Circuits Conference Digest of Technical Papers (ISSCC), 2010 IEEE International.* IEEE, 2010.

Fallin, Chris, et al. "CHIPPER: A Low-Complexity Bufferless Deflection Router." *High Performance Computer Architecture (HPCA), 2011 IEEE 17th International Symposium on.* IEEE, 2011.

Carlson, Trevor Eet al. "Sniper: Exploring the Level of Abstraction for Scalable and Accurate Parallel Multi-Core Simulation." *Proceedings of 2011 International Conference for High Performance Computing, Networking, Storage and Analysis.* ACM, 2011.

Jin, Seunghun, et al. "Implementation of a Volume Rendering on Coarse-Grained Reconfigurable Multiprocessor." *Field-Programmable Technology (FPT), 2012 International Conference on.* IEEE, 2012.

(56) References Cited

OTHER PUBLICATIONS

Park, Hanmin, et al. "Position-Based Weighted Round-Robin Arbitration for Equality of Service in Many-Core Network-On-Chips." *Proceedings of the Fifth International Workshop on Network on Chip Architectures.* ACM, 2012.
Adepta, "Epiphany—A Breakthrough in Parallel Processing" *Epiphany Multicore IP*, 2012 <http://www.adepteva.com/products/epiphany-architecture-ip/.
Rahmani, Amir-Mohammad, et al. "ARB-NET: A Novel Adaptive Monitoring Platform for Stacked Mesh 3D NoC Architectures." *Design Automation Conference (ASP-DAC), 2012 17th Asia and South Pacific.* IEEE, 2012.
Abousamra, Ahmed K., et al. "Deja Vu Switching for Multiplane NoCs." *Networks on Chip (NoCS), 2012 Sixth IEEE/ACM International Symposium on.* IEEE, 2012.
Sun, Chen, et al. "DSENT—A Tool Connecting Emerging Photonics with Electronics for Opto-Electronic Networks-On-Chip Modeling." *Networks on Chip (NoCS), 2012 Sixth IEEE/ACM International Symposium on.* IEEE, 2012. Feb. 13, 2018.
Mishra, Asit K., Onur Mutlu, and Chita R. Das. "A Heterogeneous Multiple Network-On-Chip Design: An Application-Aware Approach." *Proceedings of the 50th Annual Design Automation Conference.* ACM, 2013.
Han, Sungju, Jinho Lee, and Kiyoung Choi. "Tree-Mesh Heterogeneous Topology for Low-Latency NoC." *Proceedings of the 2014 International Workshop on Network on Chip Architectures.* ACM, 2014.

\* cited by examiner

APPARATUS AND METHOD TRANSMITTING PACKETS

CROSS-REFERENCE TO RELATED APPLICATION

This application claims the priority benefit under 35 USC 119(a) of Korean Patent Application No. 10-2015-0128568, filed on Sep. 10, 2015 in the Korean Intellectual Property Office, the disclosure of which is incorporated herein in its entirety by reference.

BACKGROUND

1. Field

The present disclosure relates to an apparatus and a method transmitting packets.

2. Description of Related Art

A data processing apparatus, such as a CPU or a processor, may include a plurality of processing units. A network enables transmission and reception of packets between the plurality of processing units. Examples of the network may include a mesh network and a tree network.

A mesh network has high packet throughput, but also long latency. Particularly, as the number of processing units of the data processing apparatus increases, a mesh network will have a long zero-load latency due to its long end-to-end diameter, and thus, the mesh network may be relatively slow at processing packets when a large amount of packets are being transmitted.

Differently, if a tree network were to be implemented in such a data processing apparatus, the tree network would have low packet throughput, though typically shorter latency than a mesh network when packets are transmitted through a particular route. A diameter of the tree network may be a logarithmic function of the number of nodes.

SUMMARY

One or more embodiments provide a multi network including a mesh network, a tree network, and a network interface connected to the mesh network and the tree network and configured to transmit, through the mesh network and the tree network, a packet generated by a processing unit, of a processing system having plural processing units, at a starting point to a destination point for another processing unit of the processing system and configured to selectively inject the packet into one of the mesh network and the tree network to transmit the packet to the other processing unit.

For the selective injecting of the packet, the network interface may be configured to select to inject the packet into the one of the mesh network and the tree network based on a determined hop-count of the mesh network regarding the packet and a determined hop-count of the tree network regarding the packet.

For the selective injecting of the packet, the network interface may be configured to only inject the packet into the tree network when the determined hop-count of the tree network is less than the determined hop-count of the mesh network.

For the selective injecting of the packet, the network interface may be configured to calculate a hop-count gain indicating a difference between the determined hop-count of the mesh network and the determined hop-count of the tree network, and configured to select to inject the packet into the tree network based on a determination that the hop-count gain meets a critical threshold and to select to inject the packet into the mesh network when the determination indicates that the hop-count gain does not meet the critical threshold.

The network interface may be further configured to measure a latency of the packet for transitioning through the tree network and to update the critical threshold based on the measured latency.

For the selective injecting of the packet, the network interface may be configured to select to inject the packet into the tree network when the packet is determined to be a broadcasting packet.

For the selective injecting of the packet, the network interface may be configured to select to inject the packet into the tree network when the network interface determines that the packet would pass through a root node of the tree network on a path to the destination point if the packet was injected into the tree network, and configured to select to inject the packet into the mesh network otherwise.

The network interface may be configured to monitor statuses of routers of a second level of the tree network, and, for the selective injecting of the packet, the network interface may be configured to control a number or proportion of packets that are injected to the tree network by updating a corresponding filtering ratio of one or more routers of a lowest level of the tree network based on a result of the monitoring.

The network interface may be configured to monitor statuses of routers of a second level of the tree network, and, for the selective injecting of the packet, the network interface may be configured to control a number or proportion of packets that are injected to the tree network by updating a corresponding filtering ratio of one or more routers of a non-root level of the tree network based on a result of the monitoring.

Routers of a second level of the tree network, distinct from a root level of the tree network, may include only data paths from child nodes to a parent node and data paths from a parent node to child nodes.

The tree network may include two or more root nodes. Each of the two or more root nodes may include a data path to a same lower level node.

For the selective injecting of the packet, the network interface may be configured to select to inject the packet into the one of the mesh network and the tree network based on set criteria instead of randomly injecting the packet into the mesh network or the tree network.

The multi network may be a Network on a Chip (NOC).

The multi network may further include the processing system having the plural processing units, where the multi network may be a System of a Chip (SoC) or a reprogrammable processor.

One or more embodiments provide a method of transmitting a packet, the method including receiving a packet, from a first processing unit at a starting point, that is set to be transmitted to a destination point for a second processing unit, determining which network, from among a connected mesh network and a connected tree network, to inject the packet into to transmit the packet to the destination point, injecting the packet into the determined network, and outputting the packet to the second processing unit at the destination point.

The determining of which network to inject the packet into may be based on a determined hop-count of the tree network regarding the packet and a determined hop-count of the mesh network regarding the packet.

The determining of which network to inject the packet into may include determining to inject the packet into the tree network when a calculated hop-count gain, indicating a difference between the determined hop-count of the tree network and the determined hop-count of the mesh network, meets a critical threshold, and determining to inject the packet into the mesh network when the hop-count gain does not meet the critical threshold.

The method may further include measuring a latency of the packet for transitioning through the tree network and updating the critical threshold based on the measured latency.

The determining of which network to inject the packet into may include determining to inject the packet into the tree network when the packet is determined to be a broadcasting packet.

The method may further include monitoring statuses of one or more routers of a second level of the tree network, and controlling, for the determining of which network to inject the packet into, a number or proportion of packets that are injected to the tree network by updating a corresponding filtering ratio of one or more routers of a lowest level of the tree network based on a result of the monitoring.

The method may further include transmitting the packet to a node at the destination point through the determined network using routers of a second level of the tree network, distinct from a root level of the tree network, that include only data paths from child nodes to a parent node and data paths from a parent node to child nodes.

The method may further include transmitting the packet to a node at the destination point through the determined network using a selected one of two or more root nodes of the tree network.

The determining of which network to inject the packet into may include determining to inject the packet into one of the mesh network and the tree network based on set criteria instead of randomly injecting the packet into the mesh network or the tree network.

One or more embodiments provide a non-transitory computer readable recording medium having recorded thereon processor readable code to cause at least one processing device to implement one or more methods discussed herein.

One or more embodiments provide a multi network including a processing apparatus including a plurality of processing units, a mesh network configured to have a mesh topology to transmit a first one or more packets, provided by a first processing unit of the plurality of processing units, to one or more corresponding set destination points for respective provision to corresponding other processing units of the plurality of processing units, a tree network configured to have a tree topology to transmit a second one or more packets, provided by the first processing unit, to one or more corresponding set destination points for respective provision to corresponding other processing units of the plurality of processing units, and a network interface connected to the mesh network and the tree network and configured to receive a packet from a processing unit, of the plurality of processing units, at a starting point, to inject the packet into a network selected between the mesh network and the tree network, to receive the packet from the selected network at a destination point, and to provide the packet to a set destination processing unit, of the plurality of processing units, at the destination point.

The multi network may be embodied on a single chip.

To select the network, the network interface may be configured to select the network to inject the packet into from one of the mesh network and the tree network based on a determined hop-count of the mesh network regarding the packet and a determined hop-count of the tree network regarding the packet.

The network interface may be configured to monitor statuses of routers of a second level of the tree network, and, to select the network, the network interface may be configured to control a number or proportion of packets that are injected to the tree network by updating a corresponding filtering ratio of one or more routers of a lowest level of the tree network based on a result of the monitoring.

Routers of a second level of the tree network, distinct from a root level of the tree network, may include only data paths from child nodes to a parent node and data paths from a parent node to child nodes.

To select the network, the network interface may be configured to select the network to inject the packet into from one of the mesh network and the tree network based on set criteria instead of randomly injecting the packet into the mesh network or the tree network.

Additional and/or alternative aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
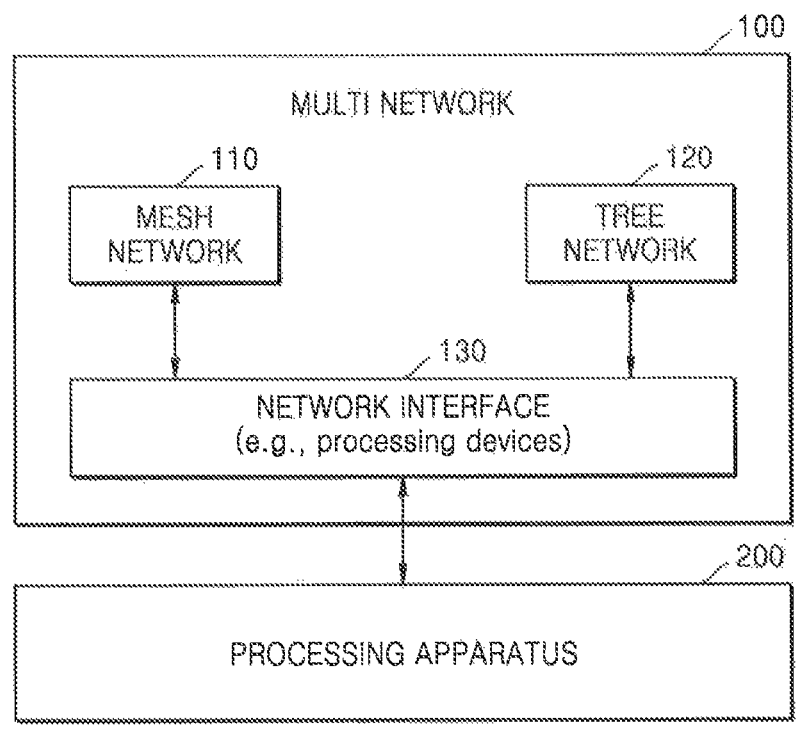
FIG. 1 is a diagram describing a multi network according to one or more embodiments.

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein may then be apparent to one of ordinary skill in the art. The sequences of operations described herein are merely non-limiting examples, and are not limited to those set forth herein, but may be changed as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Terms used herein are to merely explain specific embodiments, thus they are not meant to be limiting. A singular expression includes a plural expression except when two expressions are contextually different from each other. For example, as used herein, the singular forms "a", "an", and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude existence of one or more other characteristics, figures, operations, components, elements or combinations thereof or additional possibility. In addition, though terms such as first, second, A, B, (a), (b), and the like may be used herein to describe components, unless indicated otherwise, these terminologies are not used to define an essence, order, or sequence of a corresponding component but used merely to distinguish the corresponding component from other component(s). Furthermore, any recitation of ranges of values herein are merely intended to serve as a shorthand method of referring individually to each separate value falling within the range, unless otherwise indicated herein, and each separate value is incorporated into the specification as if it were individually recited herein.

The features described herein may be embodied in different forms, and are not to be construed as being limited to the examples described herein. Rather, the examples described herein have been provided so that this disclosure will be thorough and complete, and will convey a scope of the disclosure to one of ordinary skill in the art.

FIG. 1 is a diagram describing a multi network according to one or more embodiments. Referring to FIG. 1, the multi network 100 is hardware that may include a mesh network 110, a tree network 120, and a network interface 130. The multi network 100 may include at least two or more different networks. As only an example, FIG. 3 demonstrates one or more embodiments of how such a mesh network 110 and such a tree network 120 may be arranged with respect to corresponding processing units of the processing apparatus 200. Accordingly, the multi network 100 of FIG. 1 may be, or may be applied to, an on-chip processing apparatus including a plurality of processing units, for example, such as by a network on a chip (NOC). As an additional example, as examples of multi network device embodiments, the processing apparatus 200 may be a system on a chip (SoC) and/or a SOC that includes the processing units and the network interface multi network 100. In one or more embodiments the processing units may be separate processor cores or separate arithmetic/function devices/units of a fixed or reconfigurable processor. In one or more embodiments the processing units are configured to independently perform respective processing operations. Herein, the term 'unit' refers to processing hardware, such as one or processing devices described further below.

Thus, the processing apparatus 200 is connected to the network interface 130 of the multi network 100 and transmits packets through the multi network 100 to respective processing units of the processing apparatus 200.

As noted, the processing apparatus 200 is an apparatus that is configured to perform calculations regarding data and transmits and receives packets through the network interface 130. In detail, the processing apparatus 200 may transmit packets between processing units through the network interface 130. In an embodiment, the processing apparatus 200 may be a processing apparatus that includes plural processing/function elements/units as well as respective local and/or global register memories.

The mesh network 110 may include a plurality of routers, where the respective routers may be connected to one another in a mesh-like shape, e.g., according to a mesh network topology. The respective routers are connected to respective processing units of the processing apparatus 200 through the network interface 130. A router at a starting point of the mesh network 110 receives a packet from a processing unit of the processing apparatus 200 at the starting point through the network interface 130 and transmits the packet toward a router at a destination. The mesh network 110 then outputs a corresponding packet to a processing unit of the processing apparatus 200 at the destination through the network interface 130. The router at the starting point refers to a first router that receives the packet generated by the processing unit of the processing apparatus 200, whereas the router at the destination refers to a final router that outputs the packet to the processing unit of the processing apparatus 200 at the destination.

The tree network 120 includes a plurality of routers, where the respective routers are connected to one another in a tree-like shape, e.g., according to a tree network topology. For example, the tree network 120 may include a first level router, a second level router, and a third level router, noting that there may be additional router levels in place of the example second level routers. The first level router refers to a root node, whereas the third level router refers to a leaf node, where the leaf node may represent a destination in the tree network 120 that corresponds to a particular destination processing unit of the processing apparatus 200, for example. Furthermore, an upper node is referred to as a parent node, whereas a lower node is referred to as a child node. For example, the first level router is the parent node of the second level router. In one or more embodiments, a parent node may be connected to four child nodes.

The network interface 130 connects the processing apparatus 200 to the mesh network 110 and the tree network 120. The network interface 130 transmits a packet received from a processing unit at the starting point of the processing apparatus 200 to a processing unit at the destination of the processing apparatus 200.

The network interface 130 determines which network to inject a packet. For example, the network interface 130 may determine to inject a packet into one of the mesh network 110 and the tree network 120 based on set criteria instead of randomly injecting the packet into the mesh network 110 or the tree network 120.

The network interface 130 may determine which network to inject a packet based on characteristics of the packet, e.g., based on determined or expected/known characteristics of the packet. For example, if a packet is a broadcasting packet, the network interface 130 may be set to preferentially determine to inject the packet to the tree network 120. For example, in an embodiment, the network interface 130 may be set to always inject such a broadcasting packet to the tree network 120, or always inject such a broadcasting packet to the tree network 120 unless some other determiner indicates that the broadcasting packet should alternatively be injected into the mesh network. Herein, a broadcasting packet means a packet set to be transmitted/broadcasted to multiple processing units, such as to be transmitted/broadcasted to all processing units arranged to receive packets from a particular router according to the tree topology or all processing units of the processing apparatus 200.

Furthermore, the network interface 130 may determine which network to inject a packet based on a status of either or both networks. For example, if congestion of the tree network 120 is determined to have increased, the network interface 130 may be set to increase the proportion of packets injected into the mesh network 110, or set to only inject subsequent packets into the mesh network 110. On the contrary, if congestion of the mesh network 110 is determined to have increased, the network interface 130 may be set to increase the proportion of packets injected into the tree network 120, or set to only inject subsequent packets into the tree network 120.

Furthermore, the network interface 130 may determine which network to inject a packet based on hop-counts, or number of hops, from the starting point to the destination of the processing apparatus 200. For example, the network interface 130 may compare a number of routers that a packet would pass through if the packet is transmitted through the mesh network 110 (a hop-count of the mesh network 110) to a number of routers that a packet would pass through if the packet is transmitted through the tree network 120 (a hop-count of the tree network 120), and may be set to determine to inject the packet or subsequent similar or related packets into the network in which the packet would pass through the lesser number of routers. Additionally, or in an alternative embodiment, the network interface 130 may calculate a hop-count gain based on the determined difference between the hop-count of the mesh network 110 and the hop-count of the tree network 120. When the hop-count gain meets, e.g., is equal to or greater than, a threshold or threshold value, the network interface 130 may be set to determine to inject a corresponding packet to the tree network 120, and when the hop-count gain does not meet, e.g., is less than, the threshold or threshold value, the network interface 130 may be set to determine to inject a corresponding packet to the mesh network 110.

Furthermore, if it is determined that a packet would pass through the root node of the tree network 120 if the packet were to be injected into the tree network 120, then the network interface 130 may be set to determine to inject the packet into the tree network 120, while if the packet would not pass through the root node, then the network interface 130 may be set to determine to inject the packet into the mesh network 110. Here, any one of the above determinations of which network a packet should be injected may be implemented, or any combination of such considerations taken into account, to ultimately determine which of the mesh or tree networks to inject a packet into.

Figure 2:
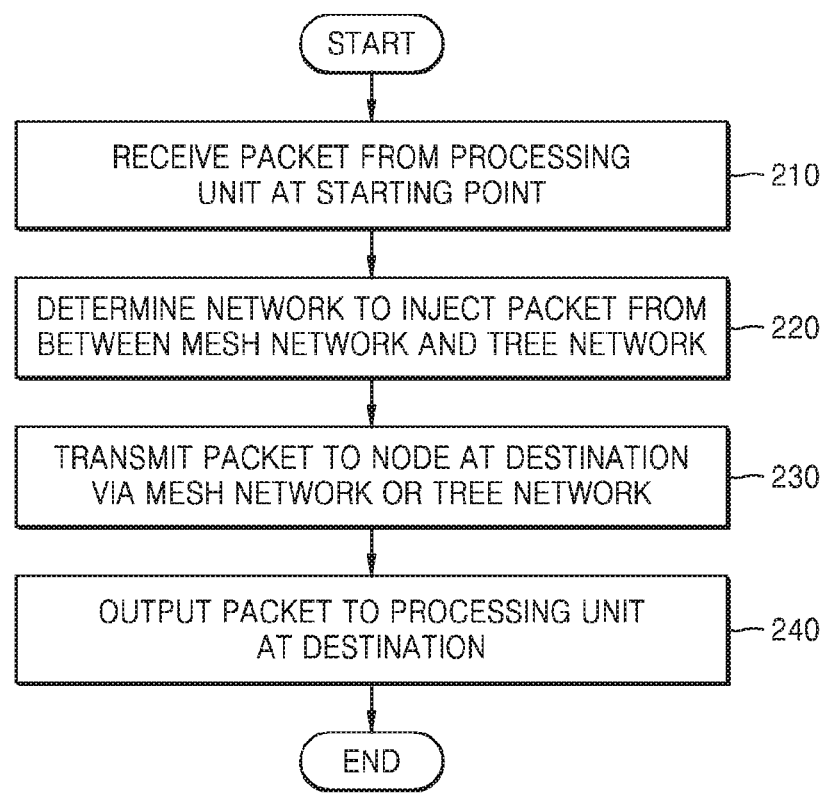
FIG. 2 is a flowchart describing a method of transmitting a packet according to one or more embodiments.

FIG. 2 is a flowchart describing a method of transmitting a packet according to one or more embodiments. Referring to FIG. 2, the multi network 100 may selectively transmit a packet to a processing unit at a destination, e.g., of the processing apparatus 200, through a mesh network 110 and a tree network 120 in communication with the processing apparatus 200.

In operation 210, the network interface 130 receives a packet from the processing unit at the starting point. The network interface 130 may be connected to respective processing units of the processing apparatus 200 and may receive packets generated by the respective processing units. The processing unit at the starting point refers to a processing unit that generates, for example, a packet and transmits the packet to another processing unit, such as to a destination point processing unit of the processing apparatus 200.

In operation 220, the network interface 130 determines which network to inject a packet into, from among the mesh network 110 and the tree network 120. As only examples, when a packet is received, the network interface 130 determines which network to inject the packet based on set criteria, such as determined or expected characteristics of the packet, statuses of the respective networks, and location of destinations, e.g., instead of randomly determining which network to inject the packet into.

In operation 230, the multi network 100 transmits a packet to a node at the destination through the mesh network 110 or the tree network 120. When the network to inject the packet is determined in operation 220, the packet is injected to the determined network. For example, if the packet is injected to the mesh network 110, the mesh network 110 then transmits the packet to a router at the destination through routers. Either of the mesh network 110 and/or the tree network 120 may automatically transmit injected packets to their respective destinations, such as by automatically routing the packet to the destination and then providing the respective packets back to the network interface 130 for provision by the network interface 130 to the destination processing unit.

Thus, in operation 240, the multi network 100 outputs the transmitted packet to the processing unit at the destination. Thus, depending on which network was used to transmit the packet, the mesh network 110 or the tree network 120 outputs the packet transmitted to a node at the destination corresponding to the network interface 130, and then the network interface 130 outputs the packet to the processing unit at the destination.

Figure 3:
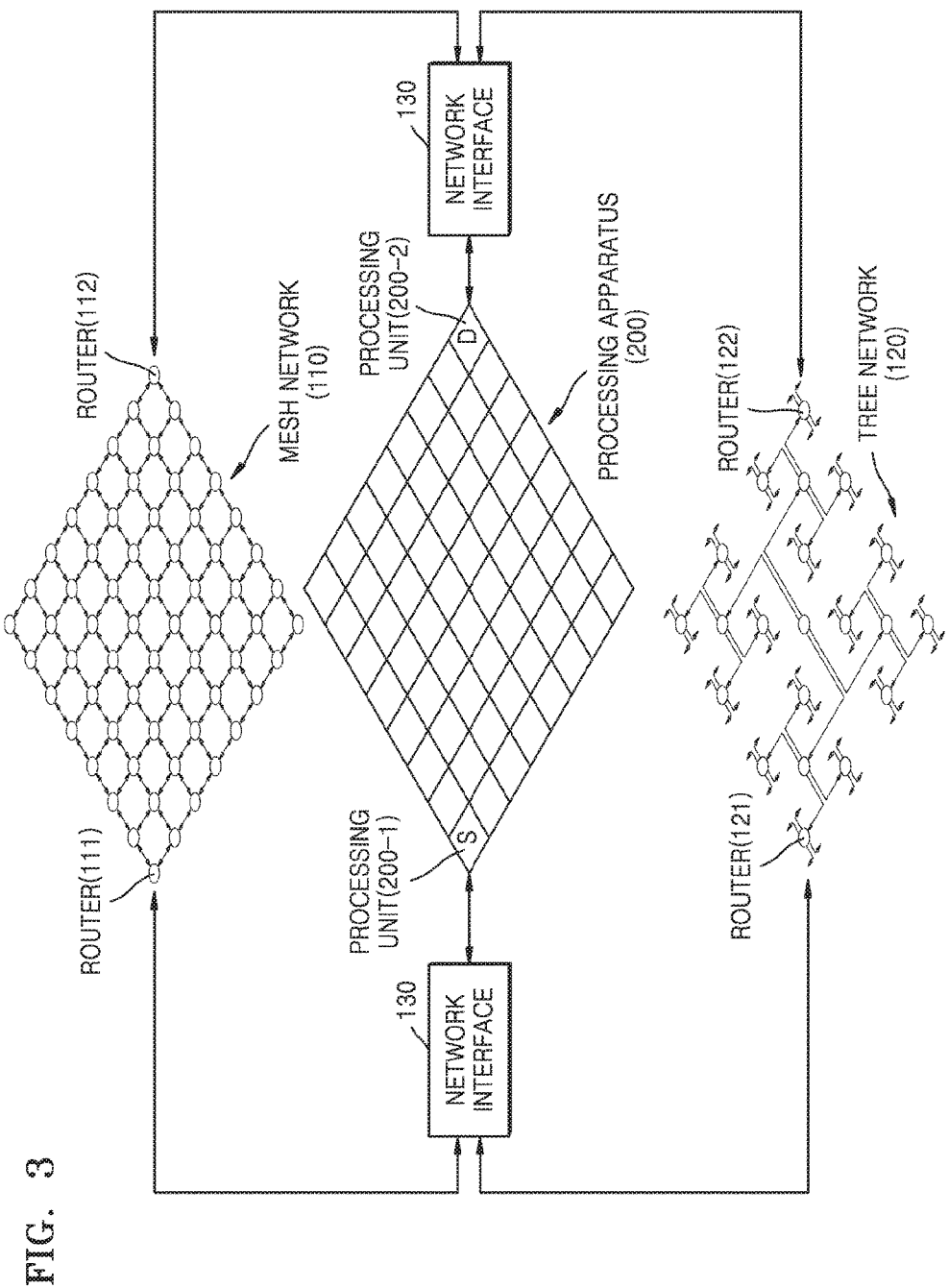
FIG. 3 is a diagram describing a multi network according to one or more embodiments.

FIG. 3 is a diagram describing a multi network according to one or more embodiments. Referring to FIG. 3, the multi network 100 may selectively transmit a packet by using either of the mesh network 110 or the tree network 120. FIG. 3 shows operation of the multi network 100 for transmitting a packet generated by a processing unit 200-1 to a processing unit 200-2.

The processing unit 200-1 generates a packet and outputs the packet to the network interface 130. In the example of FIG. 3, the destination of the packet is the processing unit 200-2.

The network interface 130 determines which network to inject a packet into, from among the tree network 120 and the mesh network 110. For example, when a packet is received, the network interface 130 determines which network to inject the packet based on set criteria, such as known of determined characteristics of the packet, statuses of either or both networks, and location or relative location of the destination, for example, instead of randomly injecting the packet into either of the networks. For example, with the starting (S) location of the processing unit 200-1 and the destination (D) location of the processing unit 200-2 in FIG. 3, the hop-count of the mesh network 110 may be 15 while the hop-count of the tree network 120 may be 5, resulting in a hop-count gain of 10 with respect to the tree network 120 over the mesh network 110. Since the hop-count of the tree network 120 is determined to be less than the hop-count of the mesh network 110, the network interface 130 may be set to determine to inject a packet to the tree network 120.

Accordingly, if the network interface 130 injects a packet into the mesh network 110, a starting point router 111 of the mesh network 110 may receive the packet. The mesh network 110 is configured to transmit the packet from the starting point router 111 to a destination router 112, e.g., to a router corresponding to the destination location of the processing unit 200-2 or the last router, in a series of routers, before the packet is delivered to the processing unit 200-2 through the network interface 130.

Rather, again with the starting (S) location of the processing unit 200-1 and the destination (D) location of the processing unit 200-2, if the network interface 130 injects the packet into the tree network 120, a starting point router 121 of the tree network 120 receives the packet. The tree network 120 is configured to transmit the packet from the starting point router 121 to a destination router 122, e.g., to a router corresponding to the destination location of the processing unit 200-2 or the last router, in a hierarchy of one or more routers from the root node, before the packet is delivered to the processing unit 200-2 through the network interface 130.

Accordingly, depending on which network the packet is injected, the destination router 112 or the destination router 122 outputs the packet to the network interface 130, and the network interface 130 then outputs the packet to the processing unit 200-2 at the destination.

Figure 4:
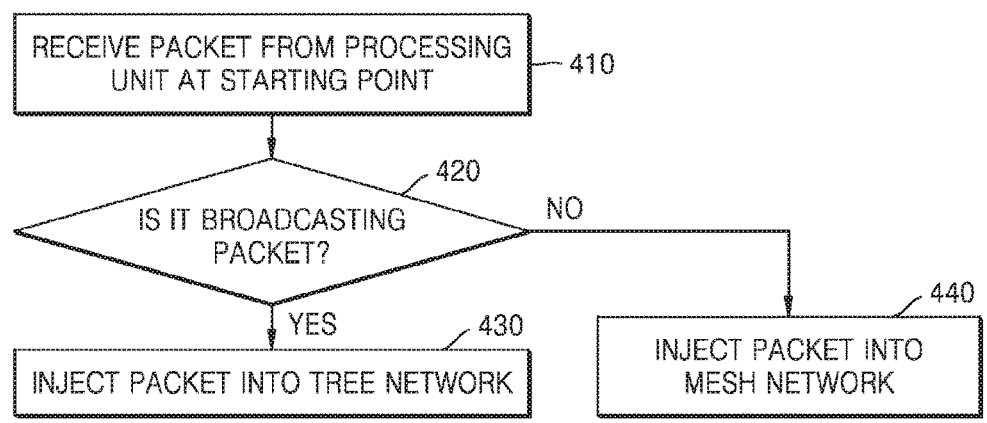
FIG. 4 is a flowchart describing a method of determining a network to inject a packet, according to one or more embodiments.

FIG. 4 is a flowchart describing a method of determining a network to inject a packet, according to one or more embodiments. Referring to FIG. 4, the network interface 130 may determine which network to inject a packet based on characteristics of the packet.

In operation 410, the network interface 130 receives a packet at or from a processing unit at the example starting point.

In operation 420, the network interface 130 determines whether the packet is a broadcasting packet. If the packet is a broadcasting packet, the method proceeds to operation 430. If not, the method proceeds to operation 440. In one or more embodiments, since a broadcasting packet should be transmitted to multiple or all processing units, it may be more efficient to transmit a broadcasting packet through the tree network 120, e.g., as there may be less hops.

Thus, in one or more embodiments, if the packet is determined or known to be a broadcasting packet, the network interface 130 injects the packet to the tree network 120, in operation 430.

Rather, if the packet is determined or known to not be a broadcasting packet, the network interface 130 may be set to determine to inject the packet to the mesh network 110, in operation 440.

Figure 5:
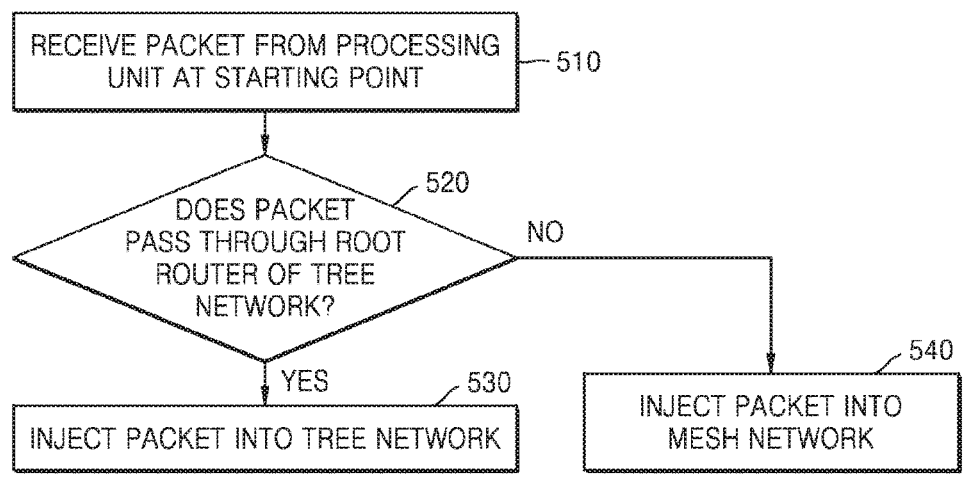
FIG. 5 is a flowchart describing a method of determining a network to inject a packet, according to one or more embodiments.

FIG. 5 is a flowchart describing a method of determining a network to inject a packet, according to one or more embodiments. Referring to FIG. 5, the network interface 130 may determine which network to inject a packet based on whether the packet passes or would pass through a root router, for example.

In operation 510, the network interface 130 receives a packet at a processing unit at the starting point.

In operation 520, the network interface 130 determines whether the packet would pass through the root router of the tree network 120 if injected into the tree network 120. In the tree topology, the root router refers to the node at the top layer of the tree network 120. For example, in operation 520, the network interface 130 may determine whether the packet would pass through the root router based on a location of a node at the starting point of the packet and a location of a node at the destination point for the packet. If the packet will pass through the root router, the method proceeds to operation 530, where the network interface 130 may be set to determine to inject the packet to the tree network 120. Here, if the packet would have to pass through the root router, based on the topology of the tree network 120 and the underlying positions of the corresponding processing units, it may be more efficient to transmit the packet through the tree network 120. For example, if the packet is determined to have to go through the root router, this may be evidence that the underlying processing units are not that close to each other and that the tree network 120 could transmit the packet to the destination with less hops than if the mesh network 110 was used.

Rather, if it is determined that the packet would not pass through the root router, the method may proceed to operation 540, where the network interface 130 is set to determine to inject the packet to the mesh network 110. Similar to above, if the packet would not pass through the root router of the tree network 120, this may be evidence of the processing units corresponding to the starting point and the destination being close, meaning that it may be more efficient to transmit the packet through the mesh network 110 or that the transmission of the packet through the mesh network 110 to the destination may more likely be achieved with less, or only minimally more, hops than if the packet was transmitted to the destination through the tree network 120.

Figure 6:
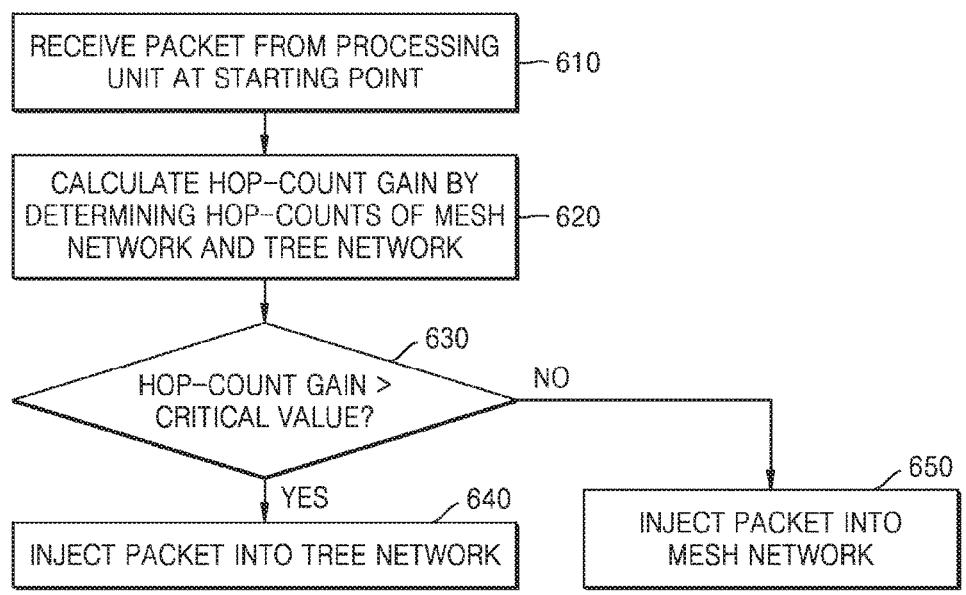
FIG. 6 is a flowchart describing a method of determining a network to inject a packet, according to one or more embodiments.

FIG. 6 is a flowchart describing a method of determining a network to inject a packet, according to one or more embodiments. Referring to FIG. 6, the network interface 130 may determine which network to inject a packet based on a determined hop-count gain.

In operation 610, the network interface 130 receives a packet at a processing unit at the starting point.

In operation 620, the network interface 130 counts the respective hop-counts that would occur if the packet were respectively transmitted through the mesh network 110 and the tree network 120. For example, the network interface 130 counts the number of routers that the packet would pass through from a node at the starting point to a node at the destination in each network. As only an example, the network interface 130 may calculate the hop-count gain, from the perspective of the tree network 120, by subtracting the determined hop-count of the tree network 120 from the determined hop-count of the mesh network 110.

In operation 630, the network interface 130 determines whether the hop-count gain meets, e.g., is greater than, a critical/threshold value. If the hop-count gain meets the critical value, the method proceeds to operation 640, where the network interface 130 may be set to determine to inject the packet into the tree network 120. If the hop-count gain does not meet the critical value, the method may proceed to operation 650, where the network interface 130 may be set to determine to inject the packet into the mesh network 110. Alternatively, in an embodiment, if the hop-counts are compared from the perspective of the mesh, representing a potential hop-count gain or loss of the mesh network 110 over the tree network 120, the corresponding threshold could be different from the critical value.

Any of the methods discussed above and shown in FIGS. 4 to 6, for example, may be singularly implemented or any two or more, or all, of such methods for determining which of the mesh network 110 and the tree network 120 to inject a packet may be used in a combination to determine which network to inject the packet. As only an example, FIG. 7 demonstrates one example case in which all of the methods demonstrated in FIGS. 4 to 6 are implemented in combination to determine which network to inject the packet into and the ultimate injecting of the packet into the determined network.

Figure 7:
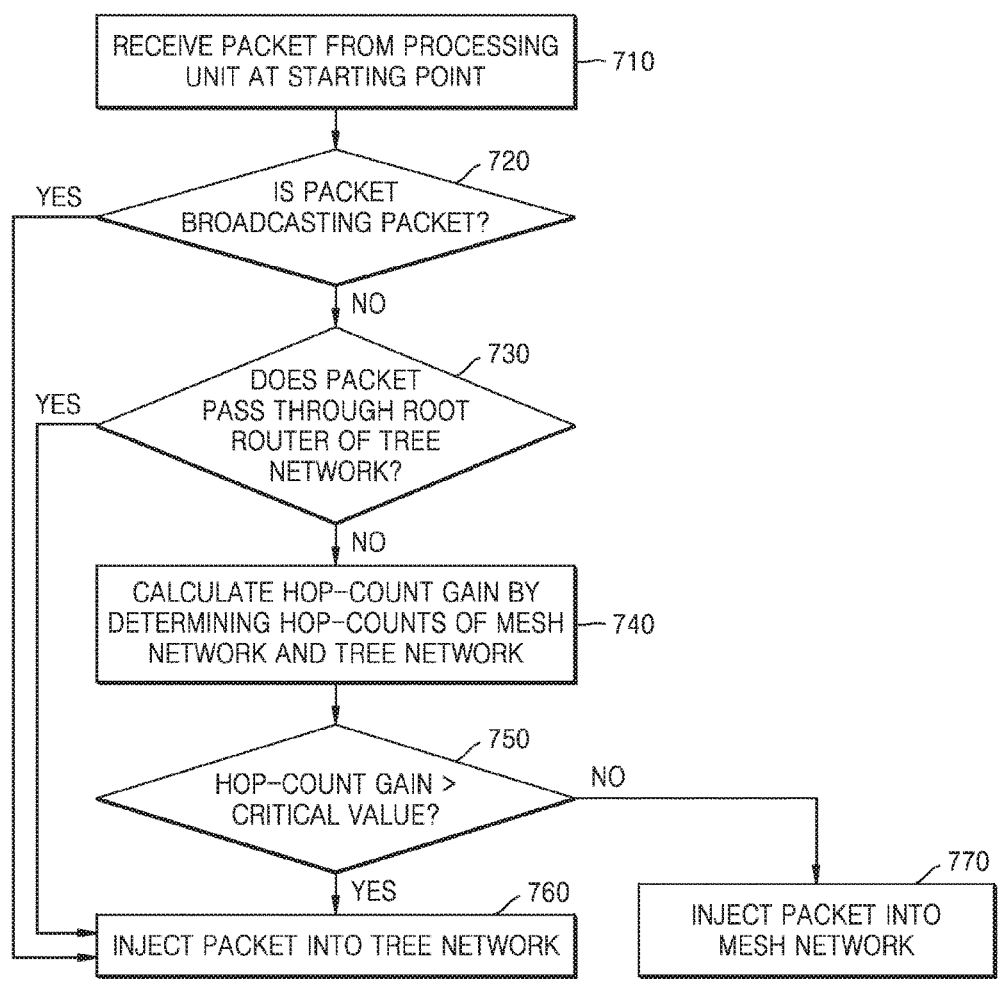
FIG. 7 is a flowchart describing a method of determining a network to inject a packet, according to one or more embodiments.

Accordingly, FIG. 7 is a flowchart describing a method for determining a network to inject a packet, according to one or more embodiments. Referring to FIG. 7, the network interface 130 may determine which network to inject a packet based on any of the example criteria described above with reference to FIGS. 4 to 6, for example.

In operation 710, the network interface 130 is configured to receive a packet at or from a processing unit at the starting point.

In operation 720, the network interface 130 is configured to determine whether the packet is a broadcasting packet, for example. If the packet is determined to be a broadcasting packet, the method proceeds to operation 760, where the packet is injected into the tree network 120. If the packet is determined to not be a broadcasting packet, the method proceeds to operation 730.

In operation 730, the network interface 130 is configured to determine whether the packet would pass through the root router of the tree network 120 if the packet was transmitted through the tree network 120. The root router refers to the node at the top layer of the tree network 120. In operation 730, it is determined whether the packet would pass through the root router based on a location of a node at a starting point of the packet and a location of a node at a destination point of the packet. Accordingly, if the network interface 130 determines that the packet would pass through the root router, the method proceeds to operation 760, where the packet is injected into the tree network 120. If the network interface 130 determines that packet would not pass through the root router if transmitted through the tree network 120, the method proceeds to operation 740.

In operation 740, the network interface 130 is configured to count or determine the respective hop-counts for the mesh network 110 and the tree network 120 for the packet, between the starting point and the destination. For example, the network interface 130 counts or determines a number of routers that a packet would pass through from a node at the starting point to a node at the destination for each of the networks. For example, the network interface 130 is configured to calculate or determine a hop-count gain by subtracting the counted or determined hop-count of the tree network 120 from the counted or determined hop-count of the mesh network 110.

In operation 750, the network interface 130 is configured to determine whether the hop-count gain meets, e.g., is greater than, a critical/threshold value, and if the network interface 130 determines that the hop-count gain meets the critical value, the method proceeds to operation 760. If the network interface 130 determines that the hop-count gain does not meet the critical value, the method proceeds to operation 770. Here, the critical value may be used to selectively only divert packets from being injected into the mesh network 110 to be injected into the tree network 120 if the hop-count gain is sufficiently high, otherwise there may be a potential for too many packets being diverted to the tree network 120 for only minimal gains while incurring more of the drawbacks of tree networks for the additionally transmitted packets, such as a low throughput for tree network topologies.

In one or more embodiments, the critical value may be updated based on determined respective congestions within the tree network 120 and the mesh network 110. For example, if the network interface 130 determines that, or there is other evidence of, the latency of a packet transmitted through the tree network 120 increases or has increased, the network interface 130 may increase the critical value to reduce a number of packets or a proportionality of the current and/or future packets to be injected to the tree network 120 compared to the number of packets injected into the mesh network 110. In one or more embodiments, the determined increase may occur when the latency meets a certain first latency threshold. On the contrary, if the network interface 130 determines that, or there is other evidence of, the latency of a packet transmitted through the tree network 120 decreases or has decreased, the network interface 130 may reduce the critical value to increase a number of packets or proportionality of the packets to be injected to the tree network 120 compared to the number of packets injected into the mesh network 110. In one or more embodiments, the determined decrease may occur when the latency fails to meet a certain second latency threshold. In differing embodiments, the first and second latency thresholds may be the same or different. In addition, the considered latency may be with respect to a respective zero-load latency. For example, whether latency has increased or decreased may be based on whether the observed latency is below or above a certain percent or level with respect to a zero-load latency for the tree network 120, such as discussed below with regard to FIG. 12.

In another example, if the network interface 130 determines or is alerted that occupancy of a buffer of the tree network 120 increases or has increased, the network interface 130 may increase the critical value to reduce a number of packets or proportionality of the packets to be injected to the tree network 120. On the contrary, if the network interface 130 determines that occupancy of a buffer of the tree network 120 decreases or has decreased, the network interface 130 may reduce the critical value to increase a number of packets or proportionality of the packets to be injected to the tree network 120.

Here, because the occupancies of the respective buffers may be different for different nodes, with some nodes being more likely to be congested than other nodes or router levels, such proportionality may also be controlled differently based on the path of the packet or for different nodes. For example, if a packet is initially determined to be transmitted through the tree network 120, some or a proportion of those determined packets may alternatively be transmitted through mesh network 110 if a corresponding second level router is determined to have such an increased buffer occupancy. The proportion of the determined packets that are alternatively transmitted through the mesh network may be based on the proportion of occupancy of the corresponding buffer or on how many times a message is received by the network interface 130 or other routers, for example, indicating that the buffer is highly utilized, such as indicting that the utilization of the buffer meets a certain threshold. Likewise, the proportion of determined packets that are alternatively transmitted through the mesh network 110 may be reduced or ceased if the buffer occupancy reduces or as messages are received indicating such lesser occupancy of the corresponding buffer(s) in the tree network 120. Additional discussions regarding such occupancy considerations will be made below with regard to FIGS. 11 and 13.

It has been found that if a tree topology is used to transmit packets between processing units there may be more idle resources with the downstream links of the tree topology from a single router to plural child nodes, as congestion is more likely to occur with upstream links of the tree topology from the child nodes toward a single router, so the downstream links may represent idle resources that can be used to transmit messages more efficiently and with less congestion. For example, such second level routers of the tree network 120 may periodically check utilization of corresponding buffers and then downward broadcast the results of that checking to all of the children of that router. In an embodiment, the downward message may be dropped if it encounters a busy link with the example downstream path.

Accordingly, in operation 760, the network interface 130 injects the packet to the tree network 120, and in operation 770, the network interface 130 injects the packet to the mesh network 110.

Figure 8:
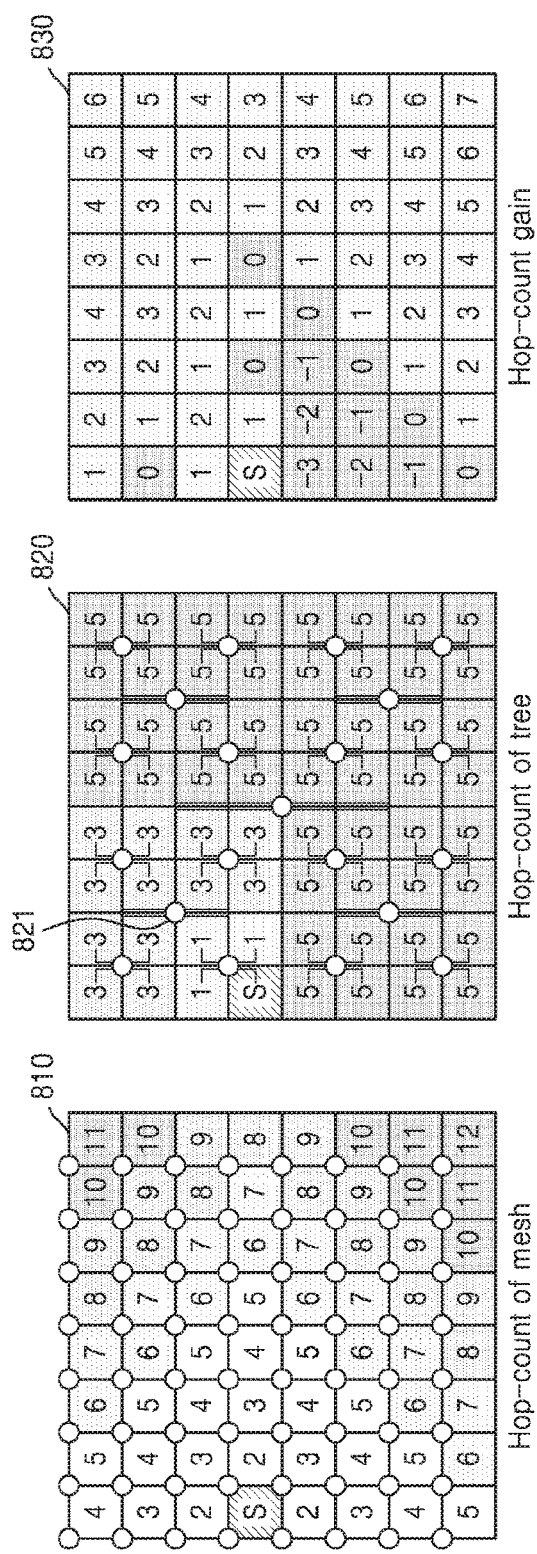
FIG. 8 is a diagram describing a method of determining a network to inject a packet based on hop-counts, according to one or more embodiments.

FIG. 8 is a diagram describing a method of determining a network to inject a packet based on hop-counts, according to one or more embodiments.

The illustrated table 810 shows hop-counts of a mesh network 110 from a starting point S to other nodes or potential destinations. The hop-count of the mesh network 110 may be proportional to the Manhattan distance. Therefore, a packet may need to pass through two routers even to a node that is closest to the starting point S, and thus the minimum hop-count for the mesh network 110 may be 2. Furthermore, the hop-count to the farthest node with the example configuration may be 12.

The illustrated table 820 shows hop-counts of a tree network 120 from the starting point S to other nodes or destinations. In the case of the tree network 120, a hop-count is determined based on whether a packet would pass through an upper level router if injected into the tree network 120. Therefore, with the example configuration, the hop-count of every node sharing the same upper level router as a node at the starting point is 1. Furthermore, using the example tree topology illustrated in FIG. 3, the hop-count of every node sharing a same second level router 821 as the node at the starting point is 3. Furthermore, the hop-count of every node that needs to pass through the root node is 5.

The illustrated table 830 shows the hop-count gains from the perspective of the tree network 120. The network interface 130 may generate such hop-count gains, depending on the corresponding destination, by subtracting a hop-count of the tree network 120 from a hop-count of the mesh network 110 for the same destination. If the hop-count gain meets, e.g., is equal to greater than, a critical/threshold value, the network interface 130 injects the packet to the tree network 120. If a hop-count gain does not meet, e.g., is less than the critical value, the network interface 130 injects a packet to the mesh network 110.

For example, table 830 shows the case in which the critical value is set to 1. Therefore, the numbers in shaded squares (numbers less than 1) indicate nodes at destinations to which packets may be determined to be transmitted through the mesh network 110, whereas the numbers in the remaining destination squares (numbers equal to or greater than 1) indicate nodes at destinations to which packets may be determined to be transmitted through the tree network 120. In such an example, if a default network is the mesh network 110, in one or more embodiments the network interface 130 may be configured to automatically inject packets into the mesh network 110 unless one or more of above noted criteria are met.

Figure 9:
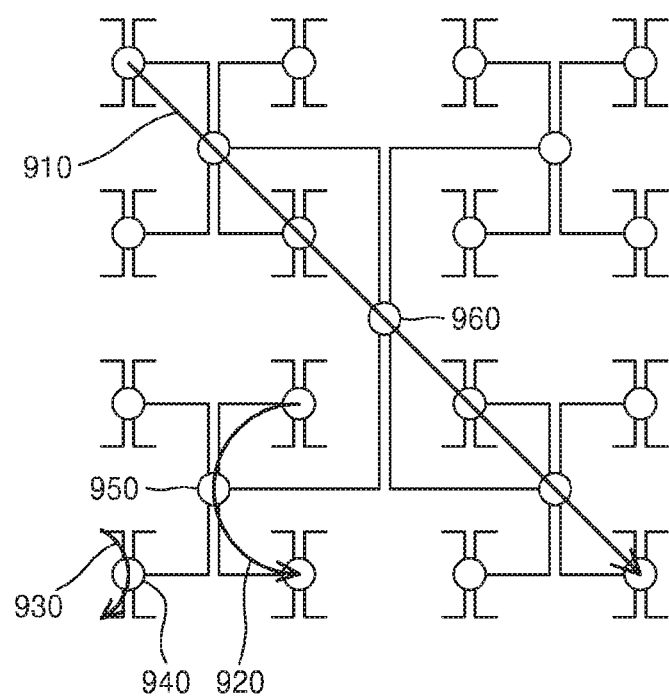
FIG. 9 is a diagram describing examples of transmitting packets in a tree network, according to one or more embodiments.

FIG. 9 is a diagram describing examples of transmitting packets in a tree network according to one or more embodiments.

A first path 910 shows a case in which the network interface 130 determines that a packet would pass through a root router of an example tree network. With the illustrated tree topology configuration of FIG. 9, since a node at the starting point, for one of the upper left corner router's illustrated processing unit links, and a node at the destination point, for one of the lower right corner router's illustrated processing unit links, are located along a diagonal line, the packet would necessarily pass through the center illustrated root router 960 if injected into the example tree network.

A second path 920 shows a case in which a packet would pass through a second level router 950, whereas a third path 930 shows a case in which a packet would pass through a third level router 940. In cases of the second path 920 and the third path 930, the packet would not pass through the root router 960, unlike the first path 910, so a hop-count gain for transmitting the packet through the example tree network would not be large, i.e., the respective hops for packets between starting and destination points along paths 920 and 930 in the tree network 120 may not be significantly or sufficiently different than hops for packets between the same starting and destination points along respective paths in the mesh network 110, as discussed above.

Thus, in an embodiment, if the network interface 130 is set to determine to inject a packet into the tree network 120 preferably or only when a packet would pass through the root router 960, such as represented by the example first path 910, then packets would only have to move through parent-child data paths and child-parent data paths in crossbars of second level routers and third level routers in the tree network 120. Therefore, in one or more embodiments, it may not be necessary for the second level routers and third level routers in the tree network 120 to have crossbar(s) for child-child data paths, compared to typical tree network topologies that may necessarily include crossbar(s) including/providing such child-child data paths. Thus, in such an embodiment, where the network interface 130 injects the packet to a tree network 120 only when a packet would pass through the root router 960, such as represented by the example first path 910, the remaining routers of the tree network 120, other than the root router 960 at the root node, may only include crossbar(s) respectively including/providing parent-child data paths and child-parent data paths, as packets that are destined for processing units supported by a same second or third level router may always, depending on embodiment, be injected into the mesh network 110.

Figure 10:
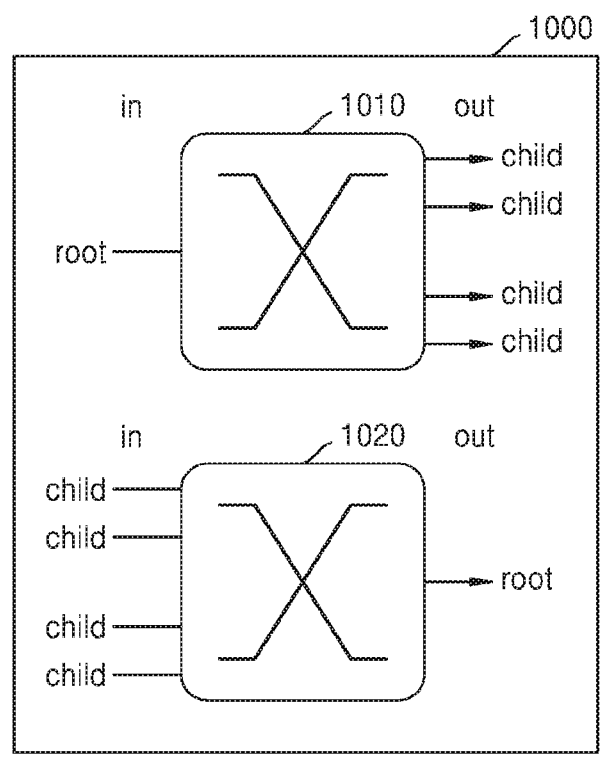
FIG. 10 is a diagram showing a router configured without child-child data paths, according to one or more embodiments.

FIG. 10 is a diagram showing a router that is configured without child-child data paths, according to one or more embodiments. As described above with reference to FIGS. 5 and 9, in accordance with the example tree network topology, in a case of transmitting a packet through the tree network 120, crossbars of routers other than a root router may not need child-child data paths. Therefore, as shown in FIG. 10, in a router 1000 a packet may be transmitted using only two crossbars. For example, in one or more embodiments a router, any or all of the second or third level routers of the tree network 120 may include only 2 crossbars.

Referring to FIG. 10, the router 1000 includes a first crossbar 1010 and a second crossbar 1020. Here, router 1000 is an example of a second level router of a tree network according to one or more embodiments. The first crossbar 1010 and the second crossbar 1020 do not include child-child data paths. Therefore, compared to a typical router in in typical tree network topologies, the router 1000 may occupy a smaller area and consume less power than a router that also includes child-child paths.

As illustrated, the first crossbar 1010 is configured to transmit a packet from the root router to child nodes, whereas the second crossbar 1020 is configured to transmit packets from the child nodes to the root router. Accordingly, the first crossbar 1010 is configured to operate as a selector, where a packet received from the root router is transmitted to a select one from among the example four child nodes, e.g., as determined by the network interface 130, while the second crossbar 1020 may be configured to operate as a MUX, where packets received from the four child nodes are transmitted in a multiplexed manner to the example one root router.

In one or more embodiments, a third level router of such a tree network may have a same structure or configuration as the router 1000. Thus, the third level router of such a tree network may also include such a first crossbar 1010 and second crossbar 1020, though the tree network may be configured so that such a first crossbar 1010 of the third level router is configured to transmit a packet from a second level router to child nodes, and such a second crossbar 1020 is configured to transmit packets from the child nodes to the second level router.

Figure 11:
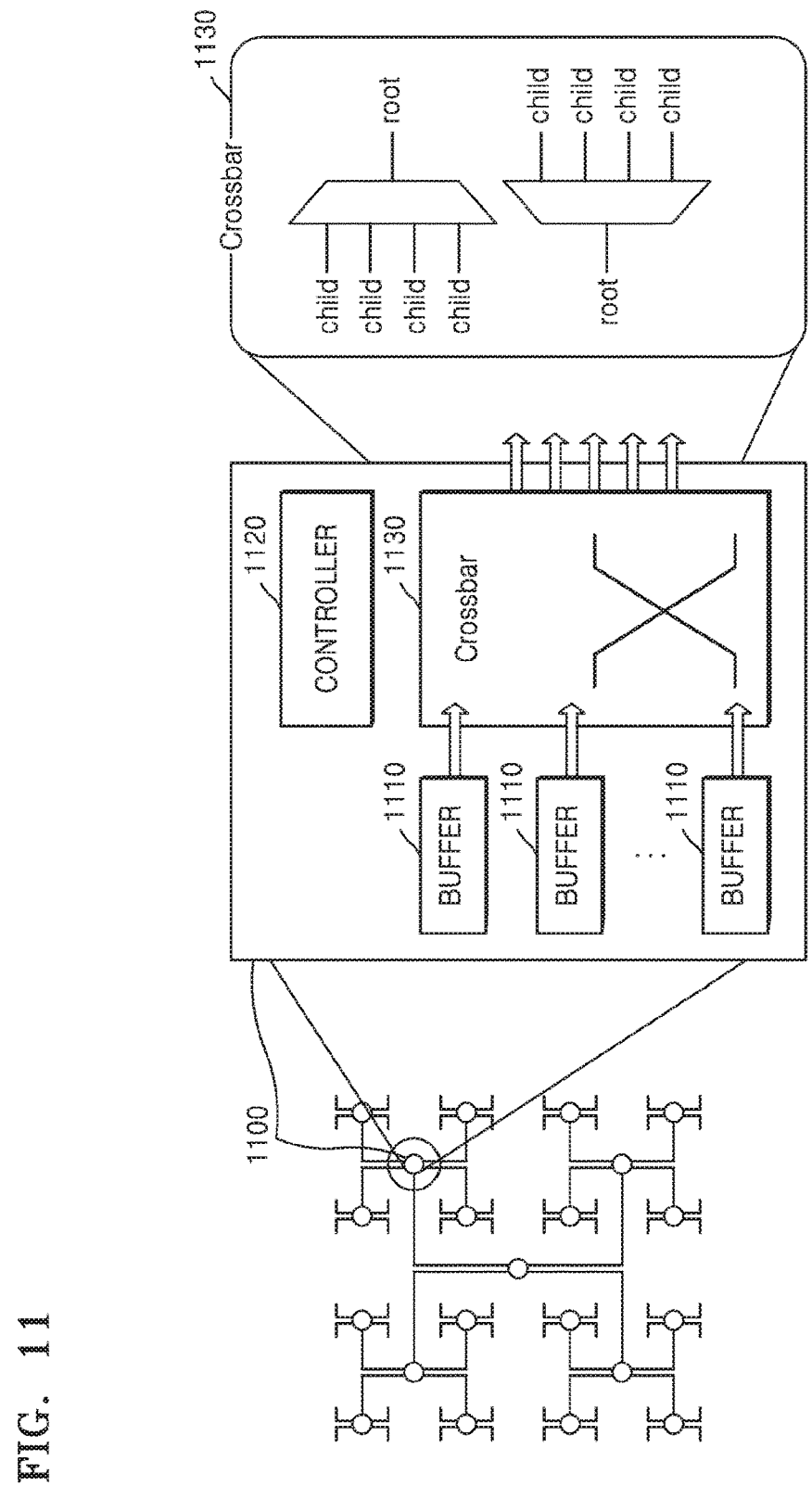
FIG. 11 is a diagram describing a structure of a router according to one or more embodiments.

FIG. 11 is a diagram describing a structure of a router according to one or more embodiments. Referring to FIG. 11, a router 1100 includes buffers 1110, a controller 1120, and a crossbar 1130. The buffers 1110 store packets received by the router 1100, e.g., in a tree network according to one or more embodiments.

The controller 1120 is configured to control the buffers 1110 and the crossbar 1130. The controller 1120 may further be configured to monitor occupancy of the buffers 1110 and transmit a result of the monitoring to the network interface 130 and/or child nodes of the router 1100, as discussed above. For example, the controller 1120 may count a number of packets stored in the buffers 1110 and transmit the counted number of the packets to the network interface 130. The network interface 130 may update a filtering ratio based on the occupancy or the counted number of the packets received from the controller 1120. Here, in one or more embodiments, the filtering ratio may correspond to an above mentioned proportionality discussed with regard to FIG. 7. Here, the filtering ratio may be determining of the proportion of packets that have initially been determined for injection into the tree network 120, e.g., based on any of the above example identified criteria, that are subsequently determined, based on the filtering ratio, to alternatively be injected into the mesh network 110 rather than the initially determined tree network 120. Thus, either the controller, child nodes of the controller, or the network interface 130 may compare the counted number of packets to one or more thresholds to determine to what extent to increase or decrease the filtering ratio, e.g., from filtering all initially determined/destined tree network 120 packets being subsequently determined to be transmitted through the mesh network 110 to all initially determined/destined tree network 120 packets being ultimately/still transmitted through the tree network 120, as discussed in further detail below.

Figure 12:
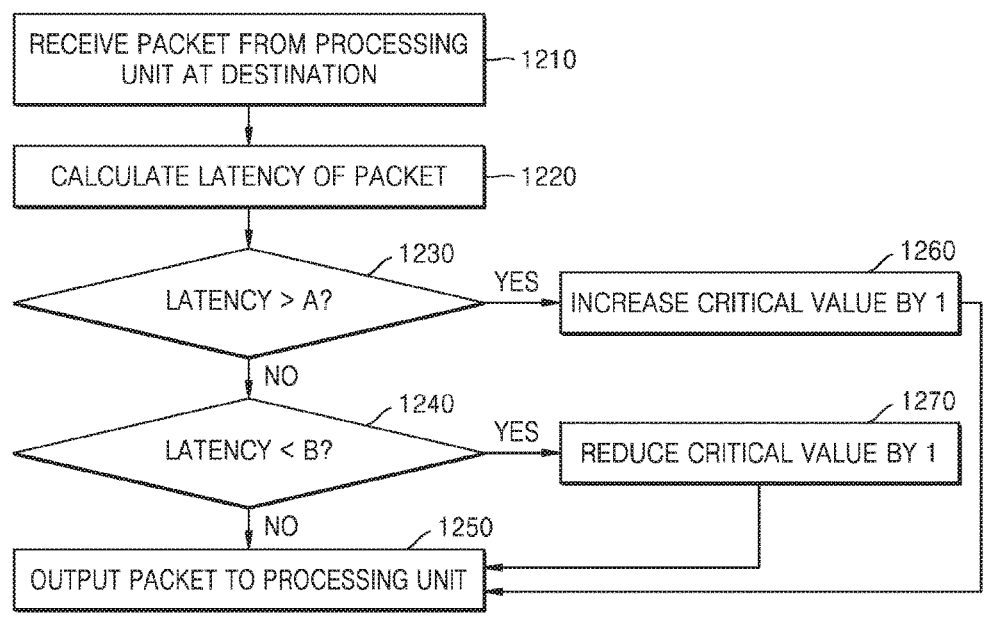
FIG. 12 is a flowchart describing a method of monitoring a latency and updating a critical value, according to one or more embodiments.

FIG. 12 is a flowchart describing a method of monitoring a latency and updating a critical value, according to one or more embodiments. The network interface 130 may monitor a latency of transmitting a packet and update the critical value regarding the consideration of the hop-count gain based on a result of the monitoring of the latency, such as discussed above with regard to the methods shown in FIG. 6 or 7, which may be used in conjunction with the method of FIG. 12. In other words, the method shown in FIG. 12 may be used together with a method using a hop-count gain to determine which network to inject a packet. Alternatively, the method shown in FIG. 12 may be used in conjunction with the method of FIG. 4 and the method of FIG. 6 or may be used in conjunction with the method of FIG. 5 and the method of FIG. 6, as only examples.

In operation 1210, the network interface 130 may receive a packet from a node of a network at a destination, i.e., after the packet was injected into the network by the network interface 130 and transitioned the network to the destination.

In operation 1220, the network interface 130 may calculate the latency of the packet, e.g., based on a determined difference between the determined or known time point at which the packet was injected to a node of the network at the starting point and the determined time point at which the packet is received by the node of the network at the destination.

In operation 1230, the network interface 130 determines whether the latency is greater than a first latency threshold. As noted above, the first latency threshold may be determined based on a zero-load latency of the tree network 120, for example, and is a reference time indicating whether the transmission of packets is being delayed due to injection of too many or a large number of packets to the tree network 120. If the latency is determined to be greater than the first latency threshold, the method proceeds to operation 1260. If not, the method proceeds to operation 1240.

In operation 1240, the network interface 130 may determine whether the latency is less than a second latency threshold. The second latency threshold may also be determined based on the zero-load latency and is a reference time indicating packets are being smoothly transmitted closer to the zero-load latency level due to injection of a small number of packets to the tree network 120, for example. If the latency is determined to be less than the second latency threshold, the method proceeds to operation 1270. If not, the method proceeds to operation 1250.

In operation 1250, the network interface 130 outputs the packet received from the node at the destination to a processing unit at the destination.

In operation 1260, the network interface 130 increases the critical value by 1, for example. Since latency greater than the first latency threshold may indicate that the tree network 120 is currently congested, the critical value is increased to reduce the number or proportion of packets that will be injected to the tree network 120. Since the network interface 130 injects a packet to the tree network 120 when a hop-count gain is greater than the critical value, as the critical value increases, the ultimate number of packets that will be injected to the tree network 120 may be reduced.

In operation 1270, the network interface 130 reduces a critical value by 1, for example. Since latency less than the second latency threshold may indicate that the tree network 120 is not currently congested, the critical value is reduced to increase the number of packets that will be injected to the tree network 120. Since the network interface 130 injects a packet to the tree network 120 when a hop-count gain is greater than the critical value, as the critical value is reduced, the ultimate number of packets that will be injected to the tree network 120 may be increased. In the method of FIG. 12, operation 1250 may be implemented before or after any or all of operations 1220-1240 and 1260-1270.

Figure 13:
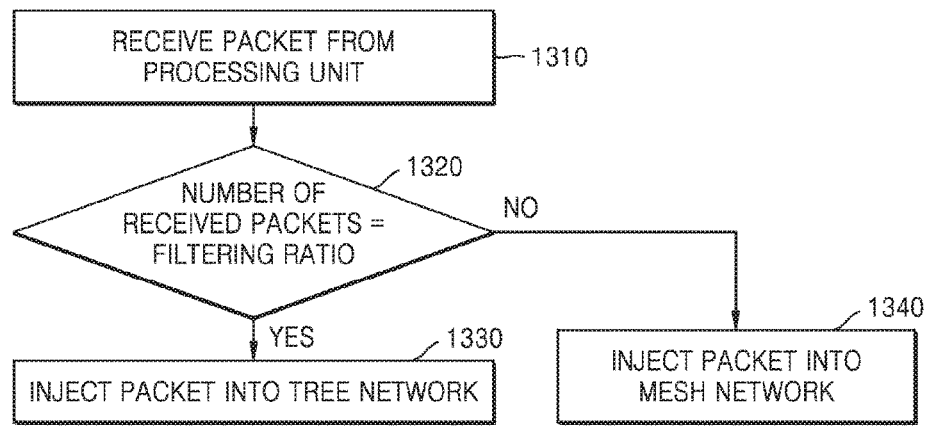
FIG. 13 is a flowchart describing a method of determining a network to inject a packet by using a filtering ratio, according to one or more embodiments.

FIG. 13 is a flowchart describing a method of determining a network to inject a packet by using a filtering ratio, according to one or more embodiments. Referring to FIG. 13, the multi network 100 may monitor a filtering ratio and control the number or proportion of packets that are to ultimately be injected to the tree network 120. Furthermore, the method of FIG. 13 may be used in conjunction with at least one of the methods of FIGS. 4 to 6.

In operation 1310, the network interface 130 may receive a packet from a processing unit at the starting point.

In operation 1320, the network interface 130 may determine or maintain a count of the number of packets that have been received and determines whether the counted number of received packets is identical, for example, to a corresponding set filtering ratio. In such an embodiment, if the count of the number of received packets is identical to the filtering ratio, the method proceeds to operation 1330. If not, the method proceeds to operation 1340. Therefore, here, when the filtering ratio is identical to the counted number of received packets, the network interface 130 injects a corresponding packet, such as the packet that increased the counted number of packets to meet the filtering ratio or a select packet from plural received packets corresponding to the counted number of received packets, to the tree network 120. In one or more embodiments, after injecting the corresponding packet into the tree network 120 the count for the number of received packets may be reset to zero. When the number of the received packets is less than the filtering ratio, the network interface 130 may inject the received packet to the mesh network 110.

The filtering ratio may be a natural number from 1 to N. The filtering ratio may be updated based on congestion of the tree network 120. For example, if congestion of the tree network 120 is determined to increase or have increased, the network interface 130 may increase the filtering ratio of the tree network 120. If congestion of the tree network 120 is determined to decrease or have decreased, the network interface 130 may reduce the filtering ratio.

In one or more embodiments, the network interface 130 may monitor occupancy of buffers included in the tree network 120 and update the corresponding filtering ratio based on a result of the monitoring. In other words, the network interface 130 may determine congestion of the tree network 120 based on occupancy of buffers and update the filtering ratio based on the congestion. High occupancy of buffers included in the tree network 120 may indicate that congestion of the tree network 120 is high. A method that may be used by a network interface to update such a filtering ratio will be described further below with reference to FIG. 14.

Returning to FIG. 13, in an embodiment, a counted number of received packets being identical or matching a filtering ratio means that a counted number of packets received from a first processing unit by the network interface 130 matches or is identical to the filtering ratio. For example, if the filtering ratio is 1, the network interface 130 determines that one packet is received from a first processing unit every time and all received packets may be injected into the tree network 120, depending on other criteria discussed above.

Rather, if the filtering ratio is 3, the network interface 130 determines to select one packet to be injected into the tree network 120 when the counted number of received packets from the first processing unit is equal to a multiple of 3, or merely every third received packet from the first processing unit may be injected into the tree network 120. For example, if the filtering ratio is 3, first and second packets received from the first processing unit are injected to the mesh network 110, and a third packet is injected to the tree network 120. Furthermore, with this example, the next two (or the fourth and fifth) packets may be injected to the mesh network 110, and the next third (or the sixth packet) is injected to the tree network 120, etc.

Numbers of packets generated by respective processing units may be different from one another. Therefore, in one or more embodiments, the network interface 130 connected to the processing units may determine whether a number of packets received from each of the processing units matches the filtering ratio or corresponding filtering ratio.

Thus, in operation 1330, the network interface 130 injects the select received packet to the tree network 120. Since a packet is injected to the tree network 120 only if a number of received packets matches or is identical to the filtering ratio, the network interface 130 may control the number of packets injected to the tree network 120.

Likewise, in operation 1340, the network interface 130 injects the remaining received packets to the mesh network 110. Thus, if a number of received packets is less than the filtering ratio and some of the received packets are injected into the mesh network 110 instead of an initially determined, for example, tree network 120, meaning that a sufficiently large number of packets are being transmitted through the tree network 120 or that the tree network 120 is congested to certain degree(s), this alternative injection of the received packets into the mesh network 110 by the network interface 130 may reduce congestion of the tree network 120.

Figure 14:
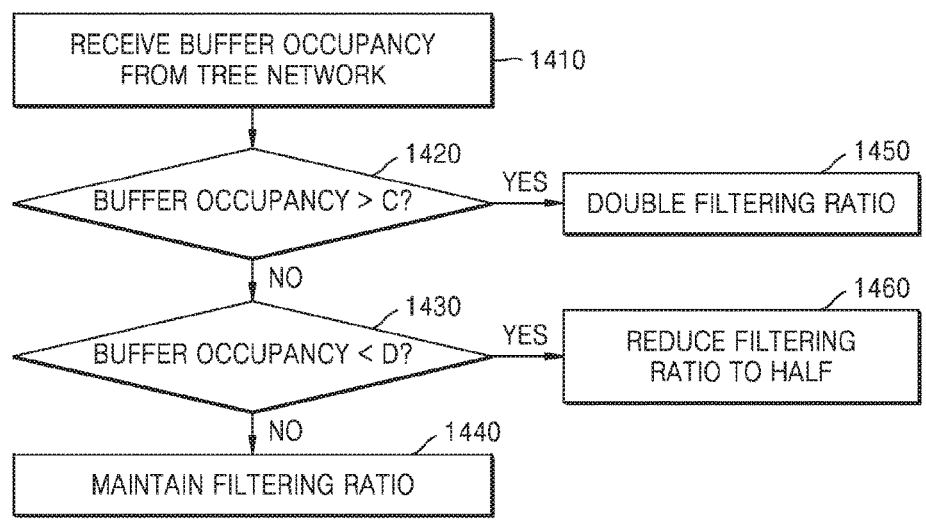
FIG. 14 is a flowchart describing a method by which a network interface updates a filtering ratio, according to one or more embodiments.

FIG. 14 is a flowchart describing a method by which a network interface updates a filtering ratio, according to one or more embodiments.

In operation 1410, the network interface 130 may receive buffer occupancy information from the tree network 120, such as from any of the routers of the tree network 120. For example, the network interface 130 may receive information indicating a number of packets that are being stored in the particular buffers 1110 of FIG. 11 for the particular second level router 1100 of the tree network 120. Since a packet transmitted to the tree network 120 may more likely pass a root router than not, the second level router 1100 may be more congested than other level routers, such as the third level routers. Therefore, the network interface 130 may update the corresponding filtering ratio based on buffer occupancy of the router 1100.

In operation 1420, the network interface 130 may determine whether the buffer occupancy for the particular router is greater than a first critical threshold or value. If the buffer occupancy is greater than the first critical threshold, the method proceeds to operation 1450. If not, the method proceeds to operation 1430. If the buffer occupancy is greater than the first critical threshold, this may mean that congestion of the tree network 120 is currently high, and thus that it may be desirable to reduce the number or proportion of packets that will be injected to the tree network 120. Therefore, by reducing the number or proportion of packets that will be next injected into the tree network 120, the network interface 130 may increase the buffer availability and over a period of time may reduce the buffer occupancy.

In operation 1430, the network interface 130 may determine whether buffer occupancy is less than a second critical threshold or value. Buffer occupancy less than the second critical threshold may indicate that a number of packets currently being transmitted through the tree network 120 is small, and thus that it may be desirable to increase the number or proportion of packets that will be injected to the tree network 120. Therefore, by increasing the number or proportion of packets that will be injected into the tree network 120, the network interface 130 may more efficiency use the tree network 120.

In operation 1440, the network interface 130 may maintain a current filtering ratio.

In operation 1450, the network interface 130 may double the filtering ratio, as only an example. Here, since the buffer occupancy of the tree network 120 has been determined to be greater than the first critical threshold, the network interface 130 reduces the number or proportion of packets to be injected to the tree network 120 by increasing the filtering ratio.

In operation 1460, the network interface 130 may reduce the filtering ratio by half, as only an example. Here, since the buffer occupancy of the tree network 120 has been determined to be less than the second critical threshold, the network interface 130 increases the number or proportion of packets to be injected to the tree network 120 by reducing the filtering ratio.

Figure 15:
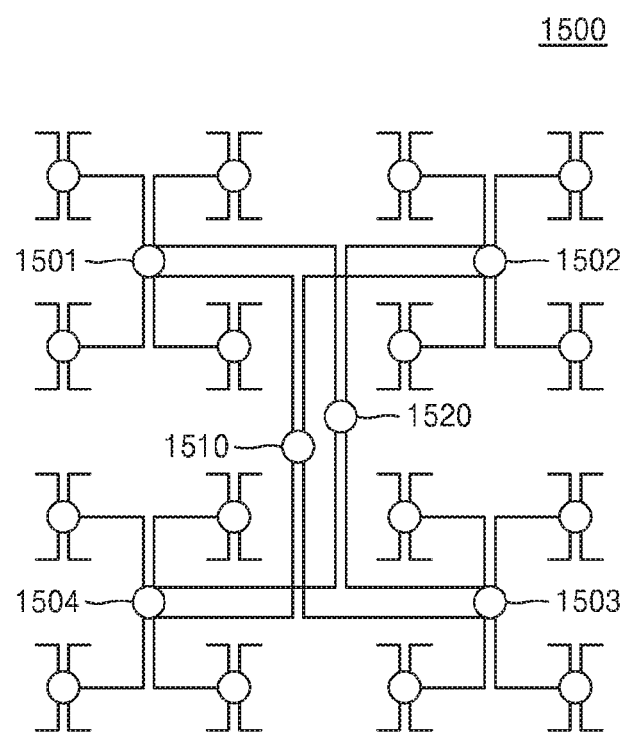
FIG. 15 is a diagram describing a tree network including a plurality of root routers, according to one or more embodiments.

FIG. 15 is a diagram describing a tree network including a plurality of root routers, according to one or more embodiments. Referring to FIG. 15, a tree network 1500 includes two, for example, root routers 1510 and 1520. Each of the root routers 1510 and 1520 may be connected to the same four second level routers 1501 to 1504 and transmit and receive packets to and from the same. The method of FIG. 15 may be used in conjunction with at least one of the methods of FIGS. 4 to 6, for example.

The second level routers 1501 to 1504 may transmit packets to any one of the root routers 1510 and 1520. For example, the second level routers 1501 to 1504 may alternately transmit packets to one of the root routers 1510 and 1520. Furthermore, the second level routers 1501 to 1504 may determine which root router to transmit packets to based on determined buffer occupancies of the respective two root routers 1510 and 1520, for example.

Since a packet injected to the tree network 120 may likely pass a root router, overall throughput of the tree network 1500 may be doubled by embodying the example two root routers 1510 and 1520.

Although FIG. 15 shows a case in which the tree network 1500 includes the two root routers 1510 and 1520, the tree network 1500 may include two or more root routers.

Figure 16:
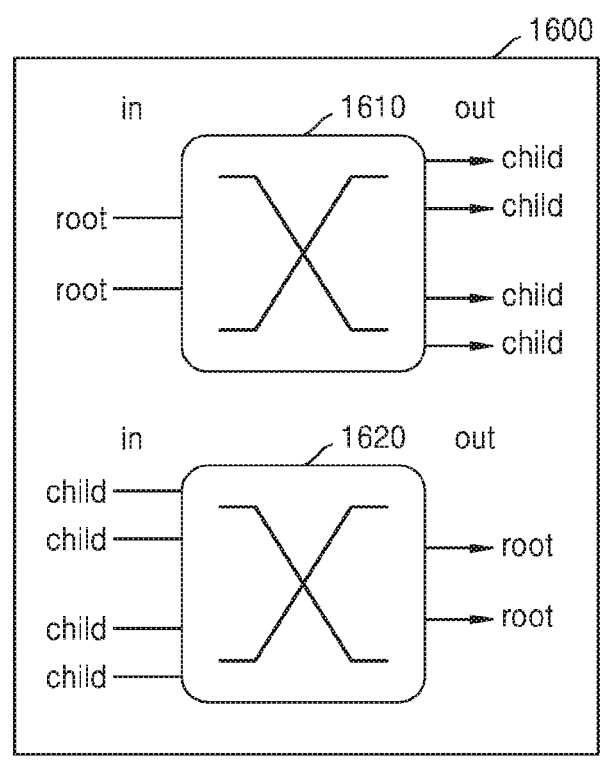
FIG. 16 is a diagram describing a router according to one or more embodiments.

FIG. 16 is a diagram describing a router according to one or more embodiments. Referring to FIG. 16, a router 1600 refers to one of second level routers connected to the root routers 1510 and 1520 of FIG. 15, for example. The router 1600 is respectively connected to each of the two root routers 1510 and 1520 and, thus, may include two input terminals and two output terminals.

As described above with reference to FIG. 10, the second level router 1000 of FIG. 10 may not include a child-child data path. Therefore, the router 1600 of FIG. 16 may only include child-parent data paths and parent-child data paths.

The router 1600 includes crossbars 1610 and 1620 that receive packets from the two root routers 1510 and 1520 and/or output packets to the two root routers 1510 and 1520. The router 1600 includes a crossbar 1610 that outputs packets received from the root routers 1510 and 1520 to the router 1600 of one of four example second level routers, noting that the routers 1510 and 1520 may send and receive packets from any of the second level routers. Furthermore, the router 1600 includes a crossbar 1620 that outputs packets received from the router 1600 to one of the root routers 1510 and 1520, noting that each of the remaining second level routers may also similarly include such a crossbar 1620 for similar communication. Similar to the discussion above regarding FIG. 10, the crossbar 1610 may act as a selector, while the crossbar 1620 may operate as a MUX.

Figure 17:
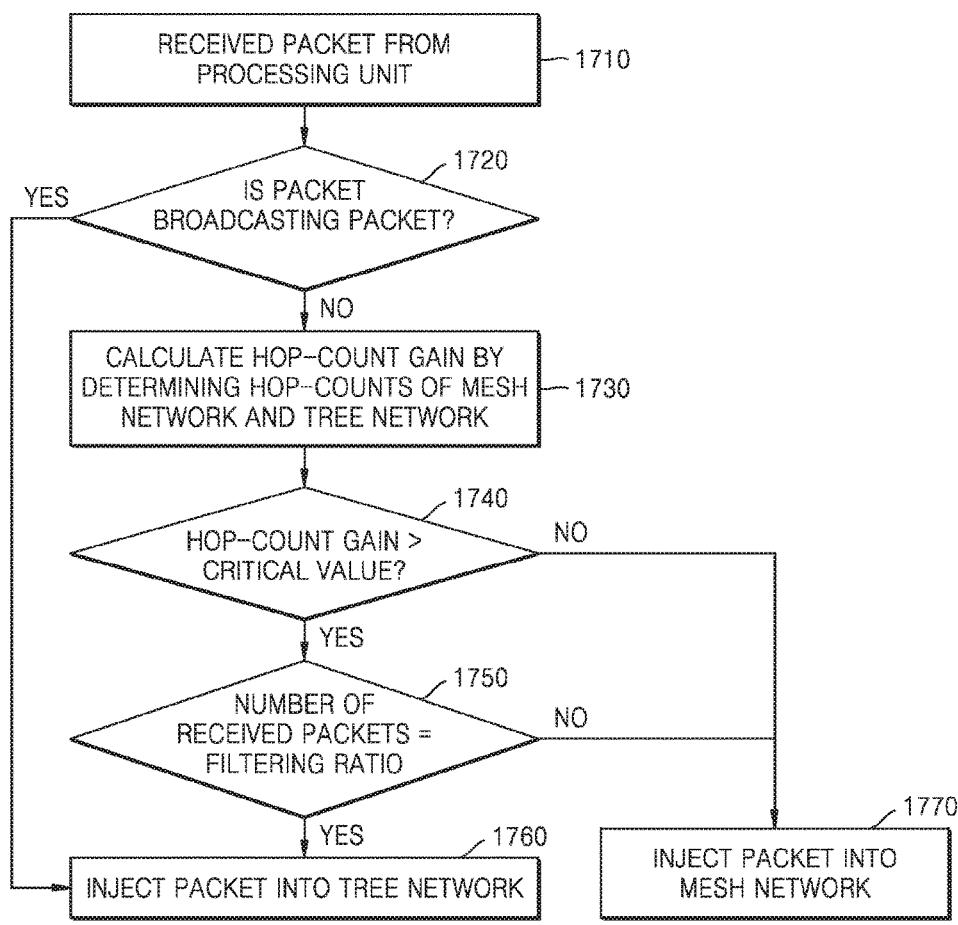
FIG. 17 is a flowchart describing a method of determining a network to inject a packet, according to one or more embodiments.

FIG. 17 is a flowchart describing a method of determining a network to inject a packet, according to one or more embodiments.

In operation 1710, the network interface 130 receives a packet from a processing unit at the starting point.

In operation 1720, the network interface 130 determines whether the received packet is a broadcasting packet. If the received packet is determined to be a broadcasting packet, the method proceeds to operation 1760. If not, the method proceeds to operation 1730.

In operation 1730, the network interface 130 determines hop-counts of the mesh network 110 and the tree network 120 for the packet and calculates a hop-count gain, e.g., from the perspective of the tree network 120.

In operation 1740, the network interface 130 determines whether the hop-count gain meets, e.g., is greater than, a critical value. If the hop-count gain is determined to meet the critical value, the method proceeds to operation 1750. If not, the method proceeds to operation 1770.

In operation 1750, the network interface 130 determines whether a number of the received packets matches a filtering ratio. If the number of the received packets is determined to match the filtering ratio, the method proceeds to operation 1760. If not, the method proceeds to operation 1770. Therefore, when the filtering ratio matches the number of the received packets, the network interface 130 injects a select packet to the tree network 120. When the number of the received packets is less than the filtering ratio, the network interface 130 injects the corresponding packet(s) to the mesh network 110.

The filtering ratio may be a natural number from 1 to N. The filtering ratio may be updated based on congestion of the tree network 120. For example, if congestion of the tree network 120 is determined to increase or have increased, the network interface 130 may increase the filtering ratio of the tree network 120. If congestion of the tree network 120 is determined to decrease or have decreased, the network interface 130 may reduce the filtering ratio.

The network interface 130 may monitor occupancy of buffers included in the tree network 120 and update the filtering ratio based on a result of the monitoring. In other words, the network interface 130 may determine congestion of the tree network 120 based on occupancy of buffers and update the filtering ratio based on the congestion. High occupancy of buffers included in the tree network 120 may indicate that congestion of the tree network 120 is high.

In an embodiment, a number of received packets matching a corresponding filtering ratio means that a number of packets received from a particular one or select processing unit(s) by the network interface 130 matches the corresponding filtering ratio. For example, if the corresponding filtering ratio is 1, for example, the network interface 130 may determine that for each one packet that is received from the example one processing unit every one packet will be injected into the tree network 120. Rather, if the corresponding filtering ratio is 3, for example, the network interface 130 may determine whether a number of packets received from the example one processing unit is equal to a multiple of 3, and only inject every third packet into the tree network 120 and the remaining packets into the mesh network 110.

The numbers of packets generated by respective processing units and provided to the network interface 130 may be different from one another. Therefore, in one or more embodiments, the network interface 130 connected to the processing units may determine whether a number of packets received from each one or select number of processing units matches a corresponding filtering ratio.

In operation 1760, the network interface 130 injects the received packets to the tree network 120. Since the hop-count gain regarding the packets has been determined to be greater than the critical value, it may be more efficient to transmit the packets through the tree network 120 than to transmit the packets through the mesh network 110. Furthermore, in an embodiment, since packets are injected to the tree network 120 only when a number of received packets match a corresponding filtering ratio, the ultimate number of packets injected to the tree network 120 may be controlled to optimize use of the tree network 120 and the mesh network 110.

In operation 1770, the network interface 130 injects the received packets to the mesh network 110. Since the hop-count gain regarding the packets is less than the critical value, it may be more efficient to transmit the packets through the mesh network 110 than to transmit the packets through the tree network 120. Furthermore, in an embodiment, if a number of received packets is less than the filtering ratio, representing that a large number of packets may currently be transmitting through the tree network 120, the network interface 130 may ultimately reduce congestion of the tree network 120 over a period of timed by ultimately injecting packets to the mesh network 110 that may have previously been determined for transmission through the tree network 120.

Figure 18:
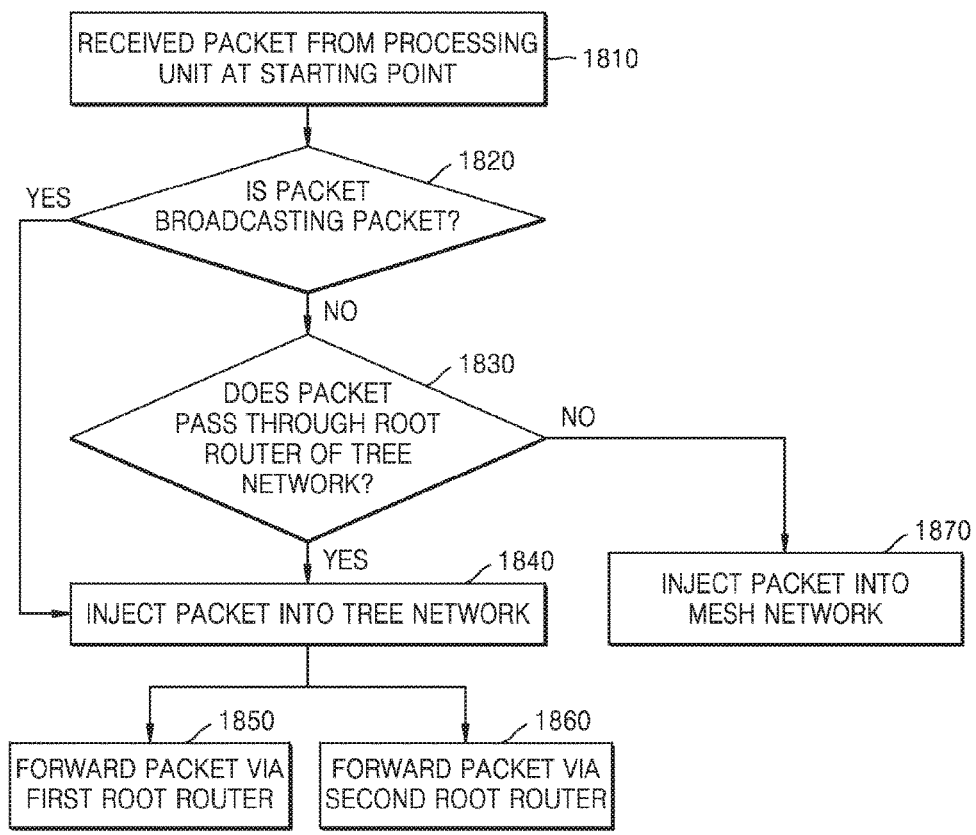
FIG. 18 is a flowchart describing a method of determining a network to inject a packet, according to one or more embodiments.

FIG. 18 is a flowchart describing a method of determining a network to inject a packet, according to one or more embodiments.

In operation 1810, the network interface 130 receives a packet from a processing unit at the starting point.

In operation 1820, the network interface 130 determines whether the received packet is a broadcasting packet. If the received packet is a broadcasting packet, the method proceeds to operation 1840. If not, the method proceeds to operation 1830.

In operation 1830, the network interface 130 determines whether the packet would pass through the root router of the tree network 120 if injected into the tree network 120. If the packet would pass through the root router, the method proceeds to operation 1840. If not, the method proceeds to operation 1870.

In operation 1840, the network interface 130 injects the packet to the tree network 120. If there are two or more root routers, the network interface 130 may determine which root router to transmit the packet through. For example, the network interface 130 may designate which one of the root routers is set to transmit one or more packets injected into the tree network 120 based on the order the packets are received. As only an example, when there are two root routers, the network interface 130 may designate that every other packet be transmitted through a particular one of the two root routers, and the remaining packets designated to be transmitted through the other root router, noting that alternative root router selection techniques can be implemented. The tree network 120 transmits the packet through the root router designated by the network interface 130.

In operation 1850, the network interface 130 controls the tree network 120 to transmit the packet injected to the tree network 120 through a first root router.

In operation 1860, the network interface 130 controls the tree network 120 to transmit the packet injected to the tree network 120 through a second root router.

In operation 1870, the network interface 130 injects the packet to the mesh network 110.

As described above, according to the one or more embodiments, selection between different networks to inject a packet may be determined by calculating a difference between hop-counts of a corresponding mesh network and tree network, for example.

Which network to inject such a packet may be determined by monitoring buffer occupancy of routers of one or more networks. For example, a broadcasting packet may be initially be determined to be transmitted through a tree network, and ultimately determined to be injected into the tree network or the mesh network based on further criteria, or such other criteria may initially be considered and then determination of whether the packet is a broadcast packet performed, if necessary. Thus, packets may be transmitted through such a tree network including two or more root routers, and packets may be transmitted through a router including only children-parent(s) data paths and parent(s)-children data paths, without child-child data paths, depending on embodiment.

The apparatuses, units, modules, devices, and other components illustrated in any or all FIGS. 1, 3, 8, 9, 10, 11, 15, and 16 that perform the operations described herein with respect to any of FIGS. 1-18 are hardware components. Examples of the hardware components include controllers, sensors, generators, drivers, and any other electronic components known to one of ordinary skill in the art. In one example, the hardware components are or include one or more processing devices, such as processors or computers, as only examples. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a specially defined manner to achieve a desired result. In one example, a processing device, such as the processor or computer may include, or be connected to, one or more memories storing instructions or software that are executed by the processor or computer. Hardware components implemented by a processor or computer execute instructions or software, such as an operating system (OS) and one or more software applications that run on the OS, to perform the operations described herein with respect to any of FIGS. 1-18. The hardware components also access, manipulate, process, create, and store data in response to execution of the instructions or software. For simplicity, the singular term "processing device", "processor", or "computer" may be used in the description of the examples described herein, but in other examples multiple processing devices, such as multiple processors or computers, are used, or a processor or computer includes multiple processing elements, or multiple types of processing elements, or both. In one example, a hardware component includes multiple processing devices or processors, and in another example, a hardware component includes a processing device or processor and a controller. A hardware component has any one or more of different processing configurations, examples of which include a single processing device or processor, independent processing devices or processors, parallel processing devices or processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-18 that perform the operations described herein with respect to FIGS. 1, 3, 8, 9, 10, 11, 15, and 16 are performed by one or more processing devices, such as a processor or a computer, as only examples, and as described above executing instructions or software to perform the operations described herein.

Instructions or software to control such a processor or computer, for example, to implement the hardware components and perform the methods as described above are written as processor or computer readable programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processing device, processor, or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a multi network device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication that uses the multi-network and/or uses such a processing apparatus with the multi network. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

Furthermore, any connecting lines or connectors shown in the various drawings are intended to represent exemplary functional relationships and/or physical or logical couplings between the various elements. It should be noted that many alternative or additional functional relationships, physical connections or logical connections may be present in a practical device.

While this disclosure includes specific examples, after a full understanding of the same it will be apparent to one of ordinary skill in the art that various changes in form and details may be made in these examples without departing from the spirit and scope of the claims and/or their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi network comprising:
a mesh network;
a tree network; and
a network interface connected between a processing apparatus having plural processing units, and each of the mesh network and the tree network, and configured to transmit, through the mesh network and the tree network, a packet generated by a processing unit of the processing apparatus, at a starting point to a destination point for another processing unit of the processing apparatus and configured to selectively inject the packet into one of the mesh network and the tree network to transmit the packet to said another processing unit;

wherein, for the selective injecting of the packet, the network interface is configured to calculate a hop-count gain indicating a difference between a hop-count of the mesh network and a hop-count of the tree network, each of which are determined by the network interface based on a path from a node at the starting point to a node at the ending point, and the network interface is configured to select to inject the packet into the tree network based on a determination that the hop-count gain exceeds a threshold and to select to inject the packet into the mesh network when the hop-count gain does not exceed the threshold.

2. The multi network of claim 1, wherein the network interface is further configured to measure a latency of the packet for transitioning from the starting point to the destination point through the tree network and to update the threshold based on the measured latency.

3. The multi network of claim 1, wherein, for the selective injecting of the packet, prior to the determination based on hop-gain count, the network interface is configured to select to inject the packet into the tree network when the packet is determined to be a broadcasting packet.

4. The multi network of claim 1, wherein, for the selective injecting of the packet, prior to the determination based on hop-gain count, the network interface is configured to select to inject the packet into the tree network when the network interface determines that the packet would pass through a root node of the tree network on a path from a node at the starting point to a node at the destination point if the packet was injected into the tree network, and configured to select to inject the packet into the mesh network otherwise.

5. The multi network of claim 1, wherein the tree network comprises a root router at a first level, and wherein routers of a second level of the tree network, distinct from the root router, comprise only data paths from child nodes to a parent node and data paths from a parent node to child nodes.

6. The multi network of claim 1, wherein the tree network comprises two or more root nodes.

7. The multi network of claim 6, wherein each of the two or more root nodes comprises a data path to a same lower level node.

8. The multi network of claim 1, wherein, for the selective injecting of the packet, the network interface is configured to select to inject the packet into the one of the mesh network and the tree network based on set criteria.

9. The multi network of claim 1, wherein the multi network is a Network on a Chip (NOC).

10. The multi network of claim 1, further comprising the processing apparatus having the plural processing units, wherein the multi network is a System of a Chip (SoC) or a reprogrammable processor.

11. A multi network comprising:
a mesh network;
a tree network; and
a network interface connected between a processing apparatus having plural processing units, and each of the mesh network and the tree network, and configured to transmit, through the mesh network and the tree network, a packet generated by a processing unit of the processing apparatus, at a starting point to a destination point for another processing unit of the processing apparatus and configured to selectively inject the packet into one of the mesh network and the tree network to transmit the packet to said another processing unit, wherein the tree network comprises a root router at a first level, and the network interface is configured to monitor statuses of routers of a second level of the tree network, and wherein, for the selective injecting of the packet, the network interface is configured to control a number or proportion of packets that are injected to the tree network by updating a corresponding filtering ratio of one or more routers of a lowest level of the tree network based on a result of the monitoring, wherein the lowest level is a level of the tree network below the first level, and the filtering ratio is a ratio of a number of packets to be injected into both the tree network and the mesh network, to a number of packets to be injected into the tree network.

12. A method of packet communication, comprising:
receiving a packet, from a first processing unit at a starting point, that is set to be transmitted to a destination point for a second processing unit;
determining which network, from among a mesh network and a tree network, to inject the packet into to transmit the packet to the destination point;
injecting the packet into the determined network; and
outputting the packet to the second processing unit at the destination point;
wherein the determining of which network to inject the packet into includes calculating a hop-count gain indicating a difference between a hop-count of the mesh network and a hop-count of the tree network, each said hop-count being determined based on a path from a node at the starting point to a node at the ending point, and determining to inject the packet into the tree network when the hop-count gain exceeds a threshold and to inject the packet into the mesh network when the hop-count gain does not exceed the threshold.

13. The method of claim 12, further comprising measuring a latency of the packet for transitioning from the starting point to the destination point through the tree network and updating the threshold based on the measured latency.

14. The method of claim 12, wherein the determining of which network to inject the packet into includes determining to inject the packet into the tree network when the packet is determined to be a broadcasting packet.

15. A non-transitory computer readable recording medium having recorded thereon processor readable code to cause at least one processing device to implement a method of packet communication, the method comprising:
receiving a packet, from a first processing unit at a starting point of a chip, that is set to be transmitted to a destination point of the chip for a second processing unit;
determining which network, from among a mesh network and a tree network, to inject the packet into to transmit the packet to the destination point;
injecting the packet into the determined network; and
outputting the packet to the second processing unit at the destination point;
wherein the determining of which network to inject the packet into includes calculating a hop-count gain Indicating a difference between a hop-count of the mesh network and a hop-count of the tree network, each said hop-count being determined based on a path from: a node at the starting point to a node at the ending point, and determining to inject the packet into the tree network when the hop-count gain exceeds a threshold and to inject the packet into the mesh network when the hop-count gain does not exceed the threshold.

* * * * *